(12) United States Patent
Jo et al.

(10) Patent No.: US 12,692,972 B2
(45) Date of Patent: Jul. 28, 2026

(54) SUPPORTING DEVICE AND DISPLAY APPARATUS INCLUDING THE SAME

(71) Applicant: SAMSUNG ELECTRONICS CO., LTD., Suwon-si (KR)

(72) Inventors: Sungdo Jo, Suwon-si (KR); Sunggi Kim, Suwon-si (KR); Sunghwan Park, Suwon-si (KR); Jinoh Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/798,080

(22) Filed: Aug. 8, 2024

(65) Prior Publication Data

US 2025/0102105 A1 Mar. 27, 2025

Related U.S. Application Data

(63) Continuation of application No. PCT/KR2024/010107, filed on Jul. 15, 2024.

(30) Foreign Application Priority Data

Sep. 22, 2023 (KR) ........................ 10-2023-0127488

(51) Int. Cl.
*F16M 11/16* (2006.01)
*F16M 11/24* (2006.01)

(52) U.S. Cl.
CPC ............. *F16M 11/16* (2013.01); *F16M 11/24* (2013.01)

(58) Field of Classification Search
CPC ................................ F16M 11/16; F16M 11/24
(Continued)

(56) References Cited

U.S. PATENT DOCUMENTS 4,226,394 A * 10/1980 Einhorn .................. A47J 47/16
                                                                  D8/367
4,602,756 A * 7/1986 Chatfield ............. F16M 11/045
                                                                  403/80
(Continued)

FOREIGN PATENT DOCUMENTS

CN          105094232 A      11/2015
CN          113503444 A      10/2021
(Continued)

OTHER PUBLICATIONS

International Search Report, PCT/ISA/210, dated Nov. 4, 2024, in PCT Application No. PCT/KR2024/010107.
(Continued)

*Primary Examiner* — Alfred J Wujciak
(74) *Attorney, Agent, or Firm* — STAAS & HALSEY LLP

(57) ABSTRACT

A supporting device for supporting a display may include a stand base including a first coupling portion; and a stand neck including a second coupling portion being couplable with the first coupling portion, the stand neck being supported by the stand base and being connectable to a rear side of the display. The first coupling portion may include: a first coupling body formed in a hollow shape; and a coupling hole formed in the first coupling body. The second coupling portion may include: a second coupling body being insertable in the first coupling body; a spring accommodated inside the second coupling body; and an elastic block being movable relative to the second coupling body by the spring and corresponding to the coupling hole.

14 Claims, 30 Drawing Sheets

(58) Field of Classification Search
USPC ............ 248/220.21, 220.22, 222.11, 222.51,
248/222.52, 223.41, 224.8, 225.11
See application file for complete search history.

(56) References Cited

U.S. PATENT DOCUMENTS

| | | | |
|---|---|---|---|
| 7,021,814 B2 * | 4/2006 | Berardi ..................... | A63J 1/00 |
| | | | 362/650 |
| 7,546,991 B2 | 6/2009 | Wang et al. | |
| 7,575,215 B1 * | 8/2009 | Clark ..................... | A01K 97/10 |
| | | | 248/539 |
| 7,733,645 B2 | 6/2010 | Hsu | |
| 8,823,883 B2 | 9/2014 | Kim et al. | |
| 2017/0261030 A1 | 9/2017 | Hung | |

FOREIGN PATENT DOCUMENTS

| | | |
|---|---|---|
| CN | 216046371 U | 3/2022 |
| KR | 10-0434171 | 6/2004 |
| KR | 10-2005-0117212 | 12/2005 |
| KR | 10-2006-0016308 | 2/2006 |
| KR | 10-0675426 | 1/2007 |
| KR | 10-2009-0090726 | 8/2009 |
| KR | 10-2009-0130551 | 12/2009 |
| KR | 10-0955480 | 4/2010 |
| KR | 10-2010-0131862 | 12/2010 |
| KR | 10-2011-0075171 | 7/2011 |
| KR | 10-1636955 | 7/2016 |

OTHER PUBLICATIONS

Written Opinion, PCT/ISA/237, dated Nov. 4, 2024, in PCT Application No. PCT/KR2024/010107.

* cited by examiner

40

420

440

432(430)

314

413

3112(311)

314

413

3132(313)

410

431(430)

312

411a
(411)

4151(415)

412

411b(411)

30

320    310    321    4152    414    315    3111
              (415)              (311)

+Z

-X

420

432(430)

40

440

4132

3161

3141

3163

3131(313)

3132(313)

413

3131(313)

4133

4131

312

411a(411)

412

3112(311)

3162

4153
(415)

414

30

4151

411b
(411)

315

321

320

3111
(311)

4152a
(4152)

4152b
(4152)

+Z

+Y

40

420

440

432(430)

314

314

413

413

3132(313)

3112(311)

431(430)

312

410

411a
(411)

414

412

4151(415)

30

320

310

321

4152
(415)

315

3111
(311)

411b
(411)

+Z

-X

1

SUPPORTING DEVICE AND DISPLAY APPARATUS INCLUDING THE SAME

CROSS-REFERENCE TO RELATED APPLICATIONS

This application is a continuation of International Application PCT/KR2024/010107, filed Jul. 15, 2024, and claims foreign priority to Korean Application 10-2023-0127488, filed Sep. 22, 2023, which are incorporated by reference herein in their entireties.

TECHNICAL FIELD

The present disclosure relates to a supporting device and a display apparatus including the same.

BACKGROUND ART

A display apparatus is a kind of output apparatus that converts acquired or stored electrical information into visual information and displays the visual information for users.

Display apparatuses include portable devices, such as notebook PCs, smart phones, and tablet PCs, as well as televisions and monitors.

The display apparatus includes a display that displays images, and a supporting device that supports the display. The supporting device supports the display such that the front side of the display on which images are displayed face users.

DISCLOSURE

Technical Problem

An aspect of the disclosure provides a supporting device with improved usability, and a display apparatus including the same.

An aspect of the disclosure provides a supporting device that is easy to be assembled and/or disassembled, and a display apparatus including the same.

An aspect of the disclosure provides a supporting device capable of being assembled and/or disassembled without separate coupling members or tools, and a display apparatus including the same.

The technical object intended to be achieved by the present document is not limited to the above-mentioned technical objects, and other technical objects not mentioned will be clearly understood by one of ordinary skill in the technical art to which the disclosure belongs from the following description.

Technical Solution

According to an embodiment, a supporting device for supporting a display may include a stand base including a first coupling portion, and the first coupling portion including a first coupling body formed in a hollow shape, and a coupling hole formed in the first coupling body; and a stand neck including a second coupling portion couplable with the first coupling portion, and the second coupling portion including a second coupling body that is insertable into the first coupling body, a spring accommodated inside the second coupling body, and an elastic block that is movable relative to the second coupling body by the spring and is engageable with the coupling hole.

According to an embodiment, the stand base and the stand neck may be configured so that the stand neck is positionable at a first position with respect to the stand base at which the second coupling body is inserted into the first coupling body and the elastic block is unengaged with the coupling hole, and the stand neck is rotatable in a first direction from the first position to a second position with respect to the stand base so that, when the stand neck is at the second position, the second coupling portion is coupled to the first coupling portion, the elastic block is engaged with the coupling hole due to movement of the elastic block relative to the second coupling body by the spring as the stand neck rotated in the first direction from the first position to the second position, and the stand neck is supported by the stand base and is connectable to a rear side of the display.

According to an embodiment, while the stand neck is at the first position, the second coupling portion may be separable from the first coupling portion, and, while the stand neck is at the second position, the second coupling portion may not be separable from the first coupling portion.

According to an embodiment, the stand base and the stand neck may be configured so that, as the stand neck rotates in the first direction from the first position to move to the second position, the elastic block protrudes from the second coupling body to become engaged with the coupling hole.

According to an embodiment, the stand base and the stand neck may be configured so that, with stand neck being at the second position and the elastic block engaged with the coupling hole, the elastic block is pressable by an external force, and, when the stand neck is at the second position and the elastic block is pressed by the external force, the stand neck is rotatable in a second direction, opposite to the first direction, to move from the second position to the first position.

According to an embodiment, the first coupling body may include a bottom portion in which the coupling hole is formed, and a side wall portion extending upward from the bottom portion, and the stand base and the stand neck may be configured so that, while the stand neck is at the first position, the elastic block interferes with the bottom portion, and, while the stand neck is at the second position, the elastic block is engaged with the coupling hole.

According to an embodiment, the stand base and the stand neck may be configured so that, while the stand neck is at the first position, the elastic block is accommodated inside the second coupling body, and, while the stand neck is at the second position, the elastic block protrudes from the second coupling body.

According to an embodiment, the spring may be configured to elastically bias the elastic block in a vertical direction.

According to an embodiment, the second coupling body may include an upper portion, and a lower portion coupled with a lower part of the upper portion and including a body hole, and the elastic block may include a locking body caught by the lower portion and accommodated inside the second coupling body, and a protruding body extending downward from the locking body and being protrudable from the second coupling body through the body hole.

According to an embodiment, the protruding body of the elastic block may be exposed to outside through the coupling hole.

According to an embodiment, the second coupling portion may include a coupling protrusion on an outer side surface of the second coupling body, and the first coupling portion may include a coupling groove in an inner side surface of the first coupling body and configured to guide the coupling protrusion, and a locking protrusion configured to prevent, while the stand neck is at the second position, the coupling protrusion from departing from the coupling groove, the locking protrusion being adjacent to the coupling groove.

According to an embodiment, the coupling groove of the first coupling portion may include a first groove portion configured to accommodate the coupling protrusion while the stand neck is at the first position, and a second groove portion extending from a lower part of the first groove portion and configured to accommodate the coupling protrusion while the stand neck is at the second position.

According to an embodiment, the locking protrusion may include a first inclined portion inclined downward from the first groove portion toward the second groove portion, and the coupling protrusion may include a second inclined portion corresponding to the first inclined portion.

According to an embodiment, the first coupling portion may include a fixing rib protruding toward the second groove portion to fix the coupling protrusion accommodated in the second groove portion.

According to an embodiment, the first coupling portion may include a fixing rib on an inner side surface of the first coupling body to fix, while the second coupling portion is coupled to the first coupling portion, an outer side surface of the second coupling body.

According to an embodiment, the stand neck may include a frame including the second coupling portion and extending in a vertical direction, a supporting arm configured to support the rear side of the display, and a lifting member configured to move the supporting arm in the vertical direction with respect to the frame.

According to an embodiment, a display apparatus may include: a stand base including a first coupling portion; a stand neck including a second coupling portion corresponding to the first coupling portion; and a display including a display panel on which an image is displayed and a cover covering a rear side of the display panel and supported by the stand neck. The first coupling portion may include: a first coupling body including a bottom portion and a side wall portion extending from the bottom portion; a hollow part formed by the side wall portion; and a coupling hole penetrating the bottom portion. The second coupling portion may include: a second coupling body being insertable into the hollow part; and an elastic block connected to the second coupling body, being movable relative to the second coupling body, and including a shape corresponding to the coupling hole.

4

Figure 8:
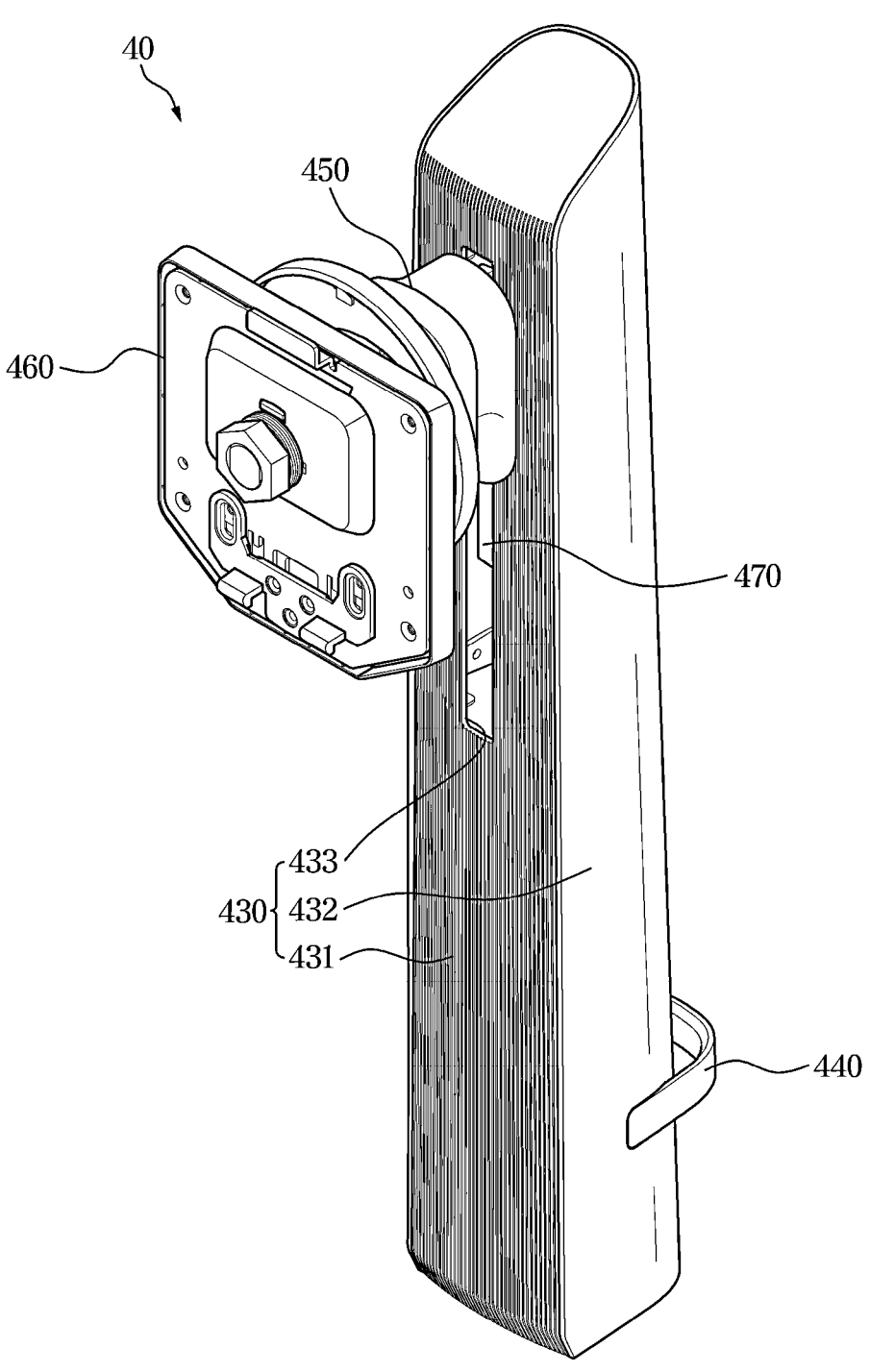
FIG. 8 is a perspective view of a stand neck according to an embodiment.
Figure 10:
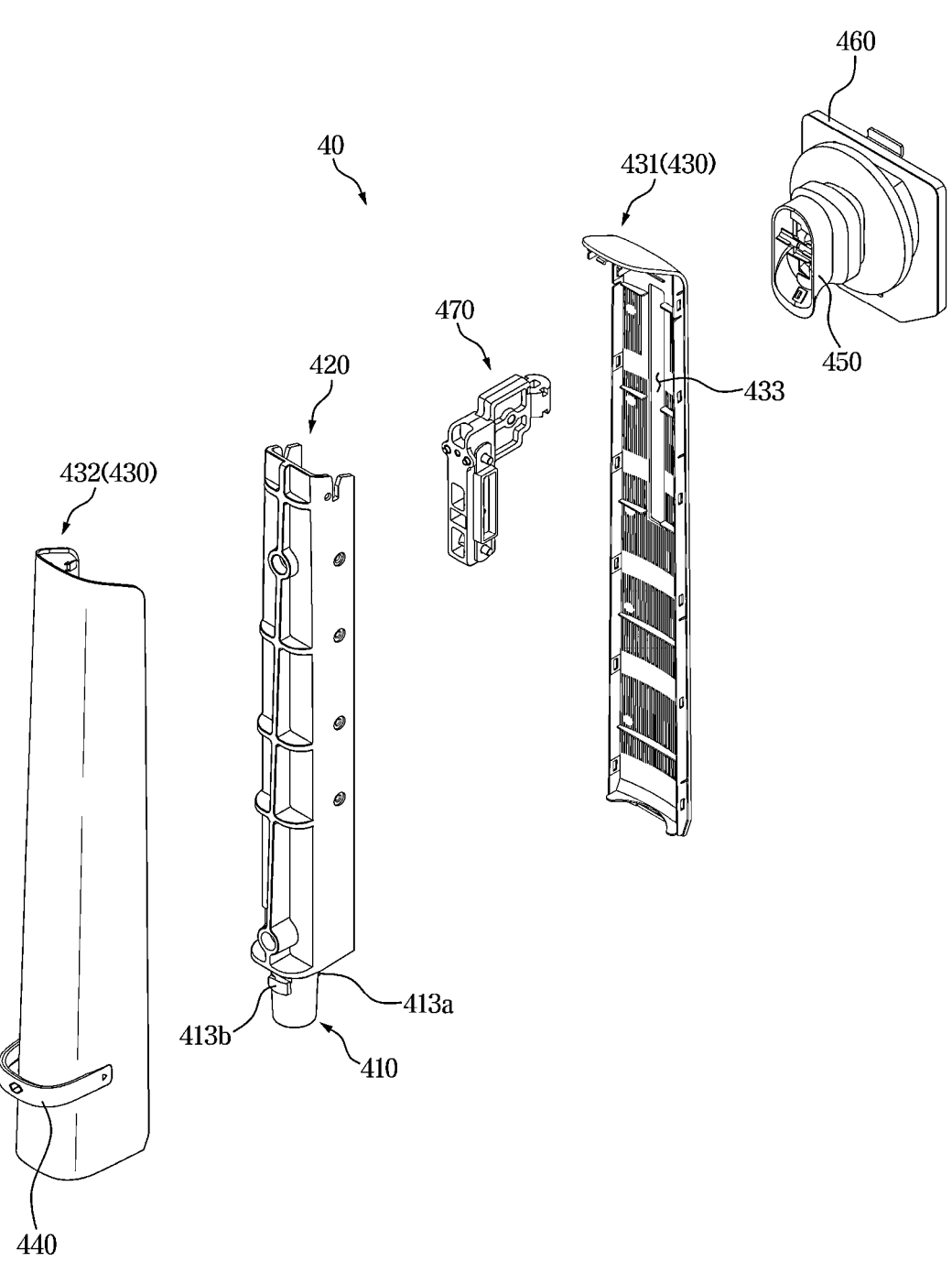

FIG. 10 is an exploded view of the stand neck shown in FIG. 8.

Figure 11:
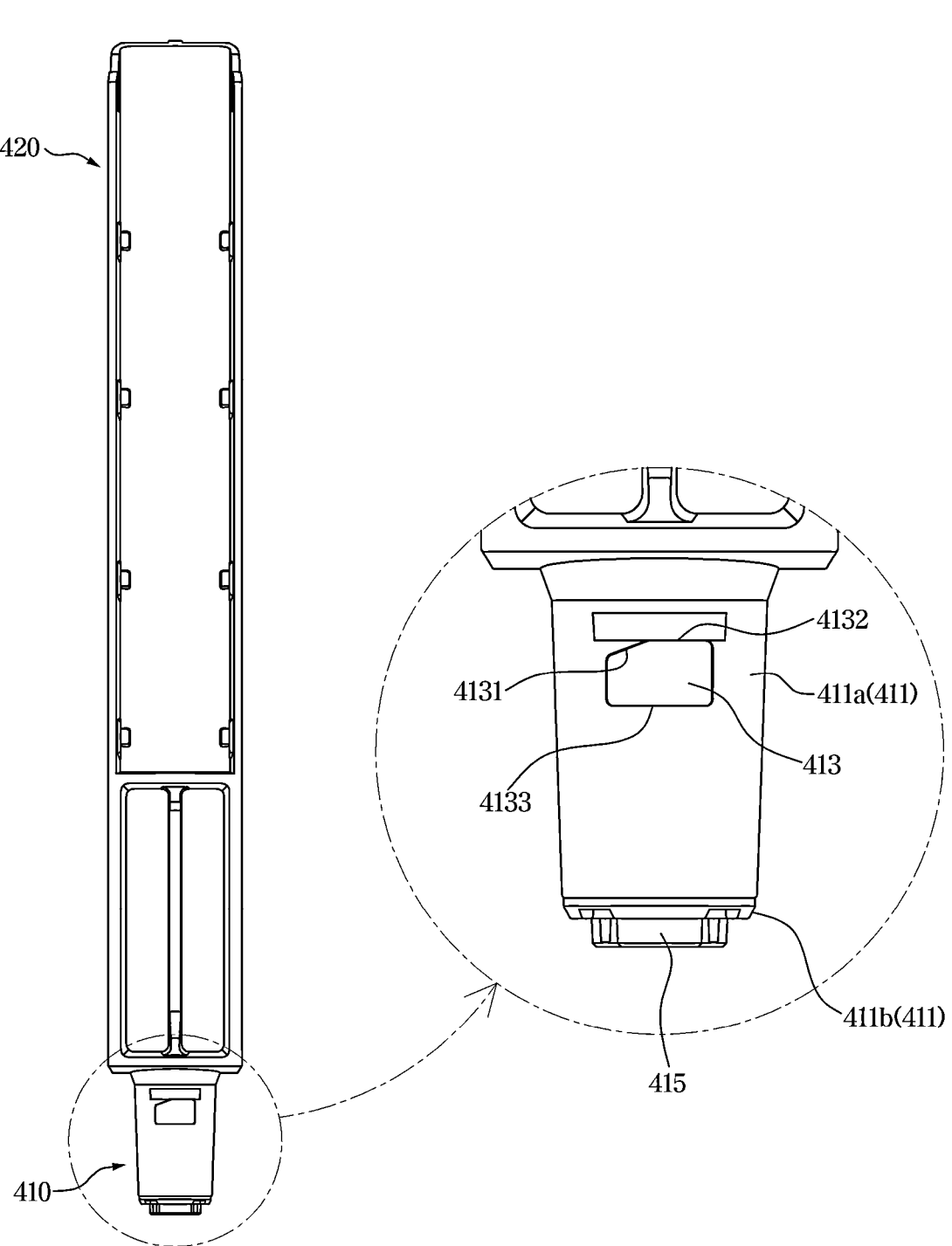

FIG. 11 is a front view of a frame according to an embodiment.

Figure 12:
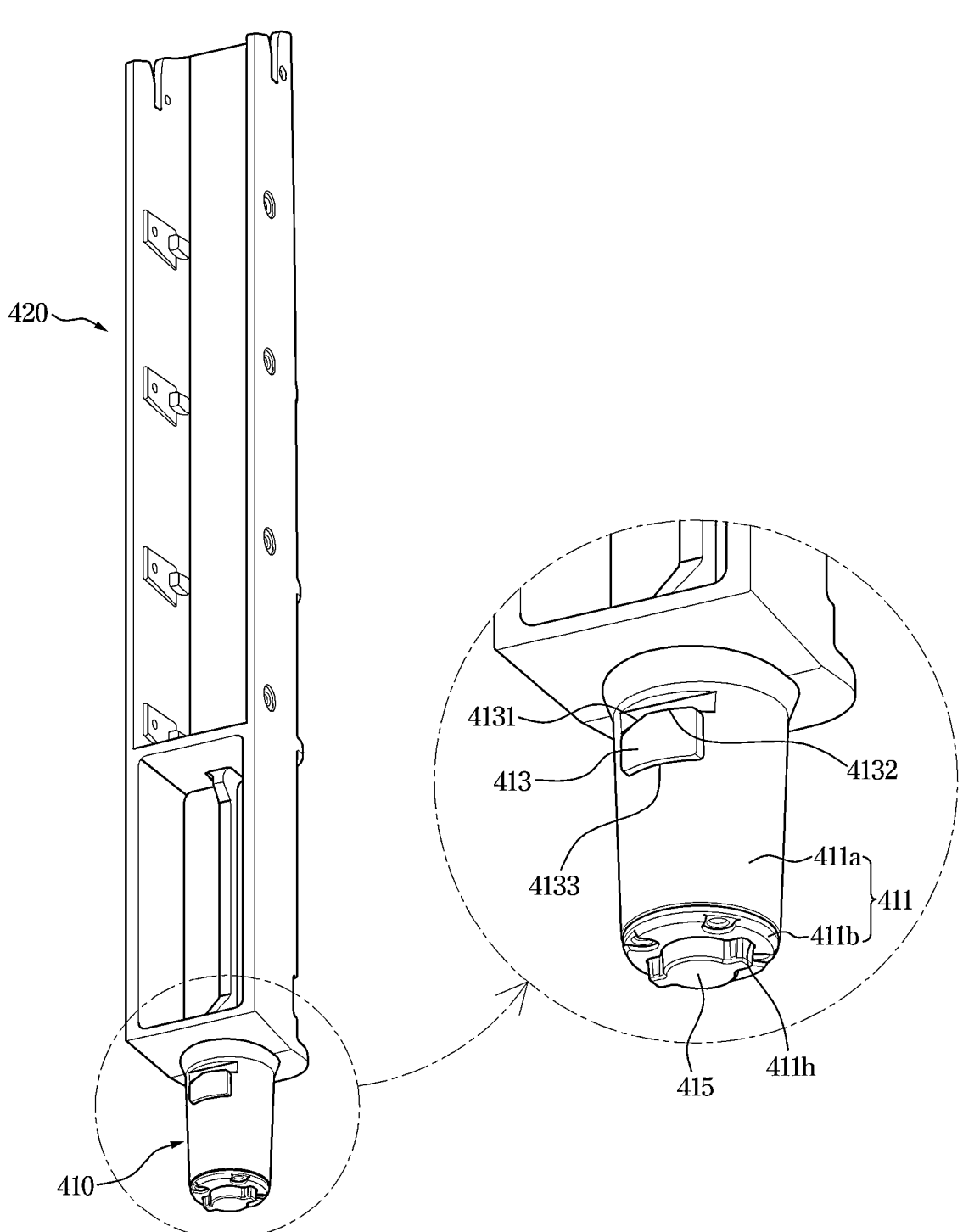

FIG. 12 is a bottom perspective view of a frame according to an embodiment.

Figure 13:
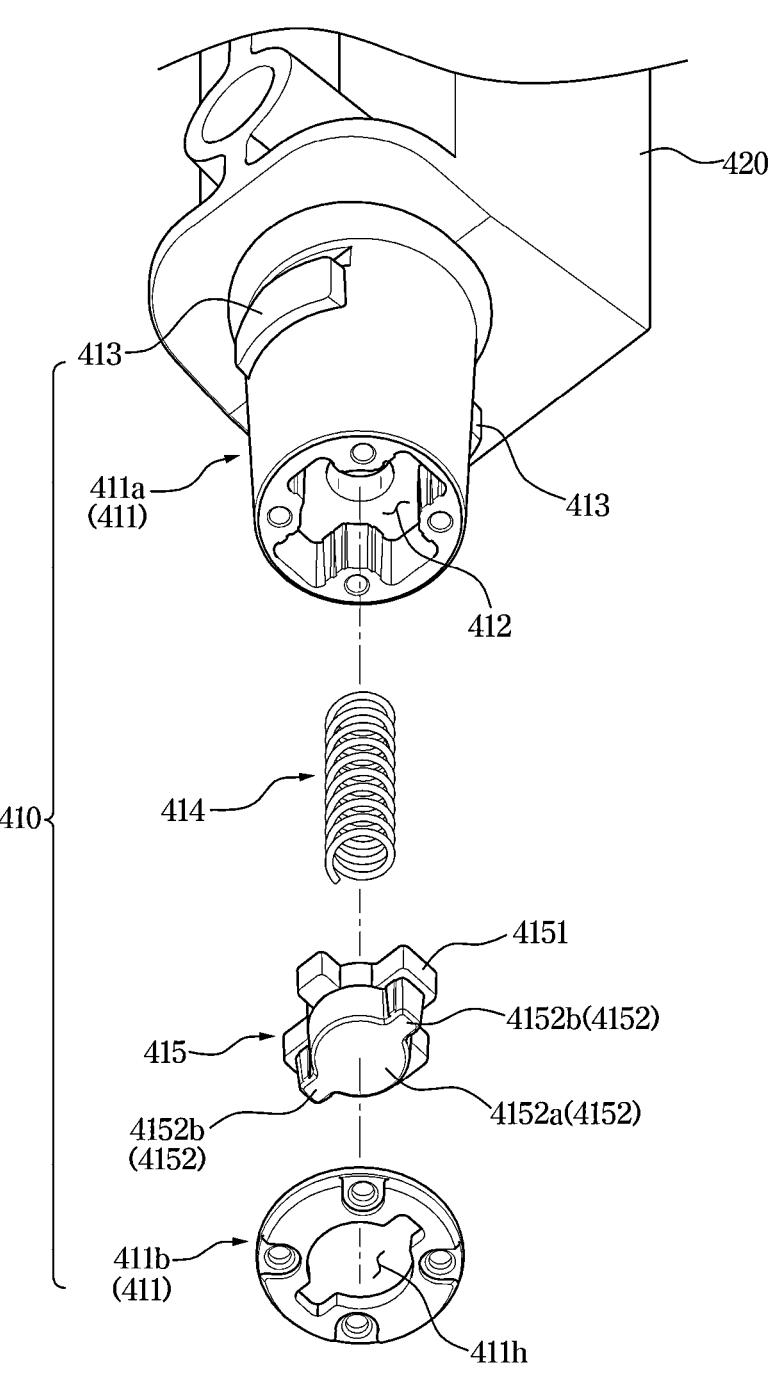

FIG. 13 is an exploded view of a coupling portion of a stand neck according to an embodiment.

Figure 14:
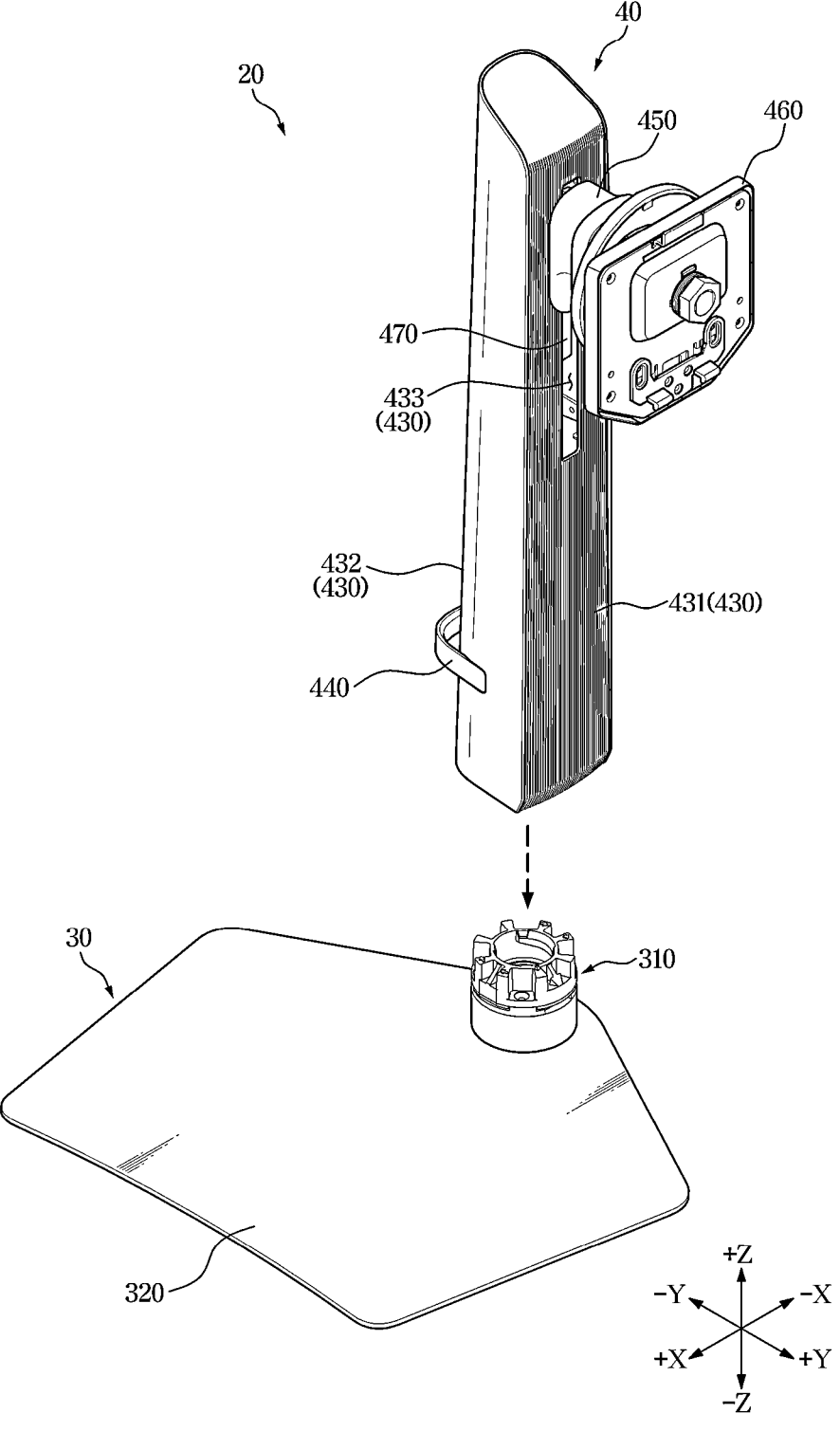

FIG. 14 shows an example of a state in which a stand neck is aligned with a stand base.

Figure 15:
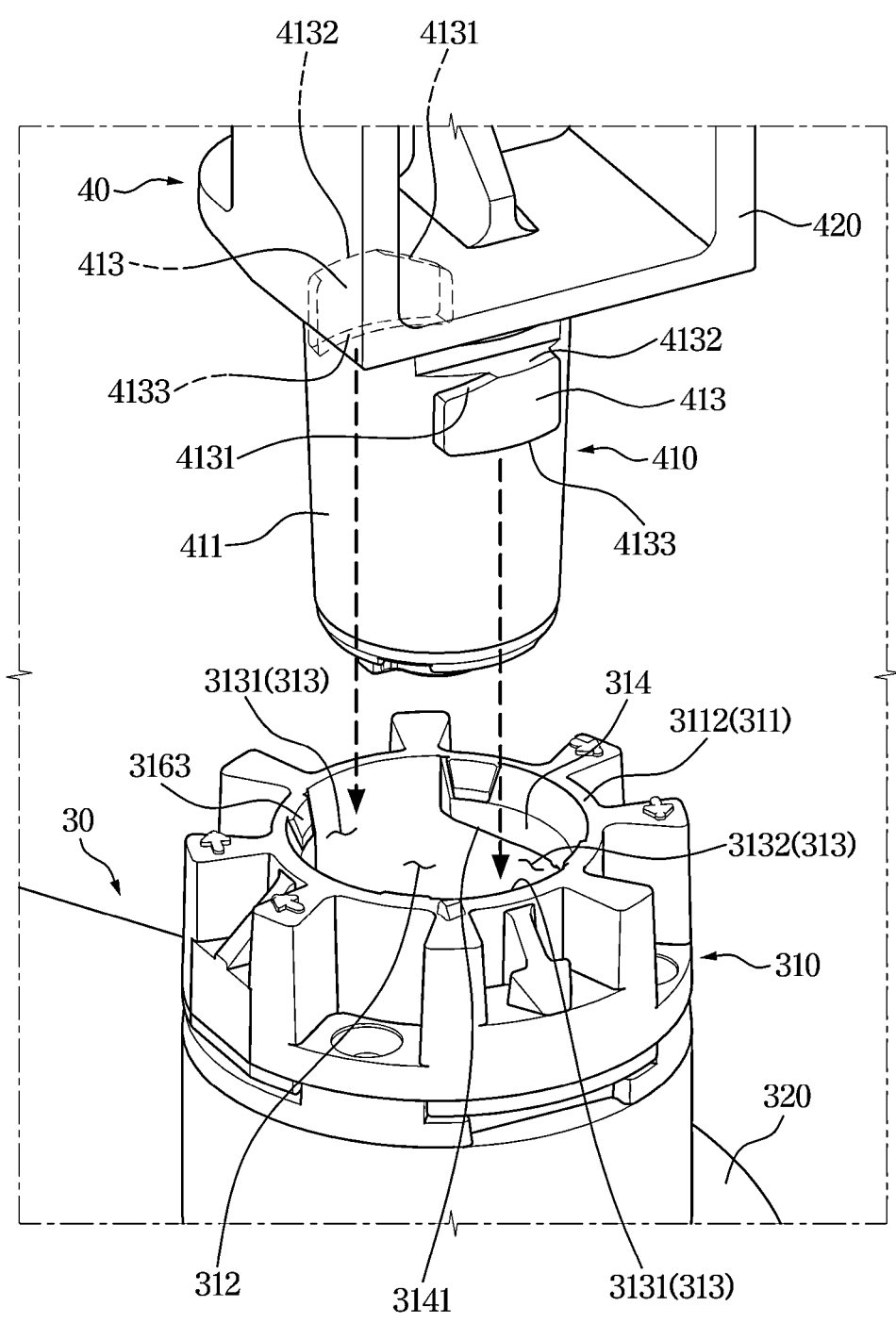

FIG. 15 is an enlarged view showing some portions of the stand base and the stand neck shown in FIG. 14.

Figure 16:
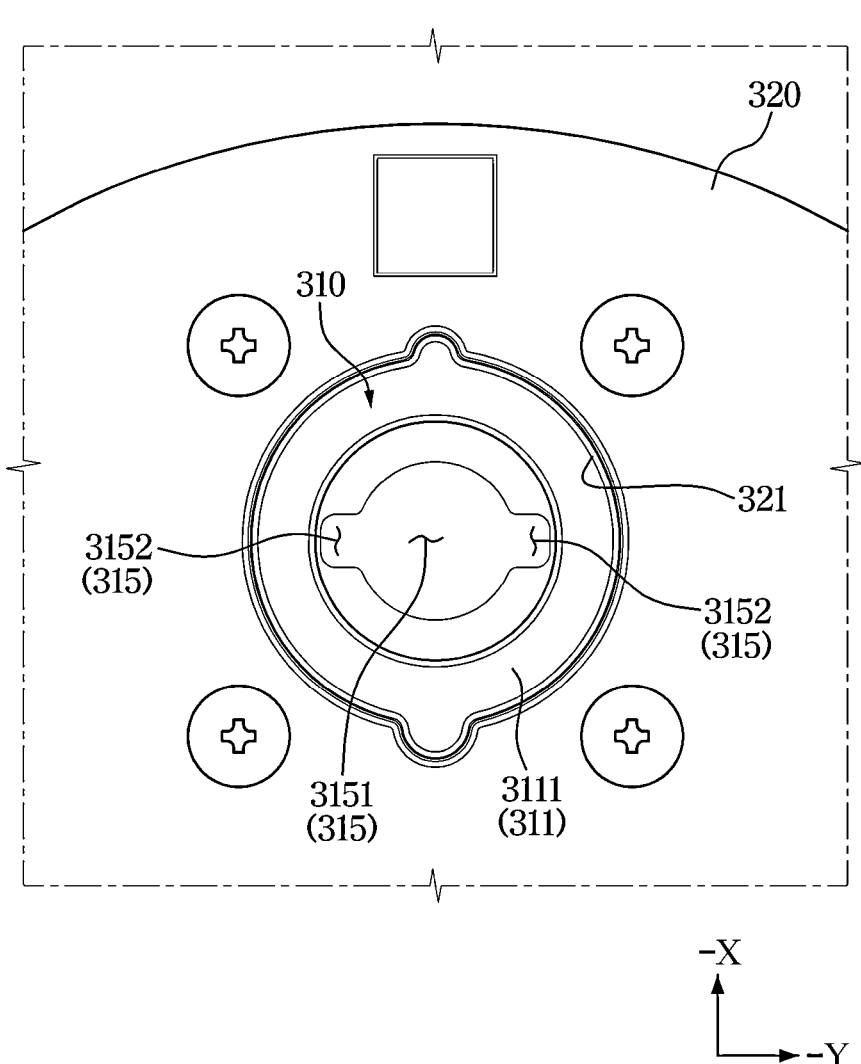

FIG. 16 is an enlarged view showing parts of bottoms of the stand base and the stand neck shown in FIG. 14.

Figure 17:
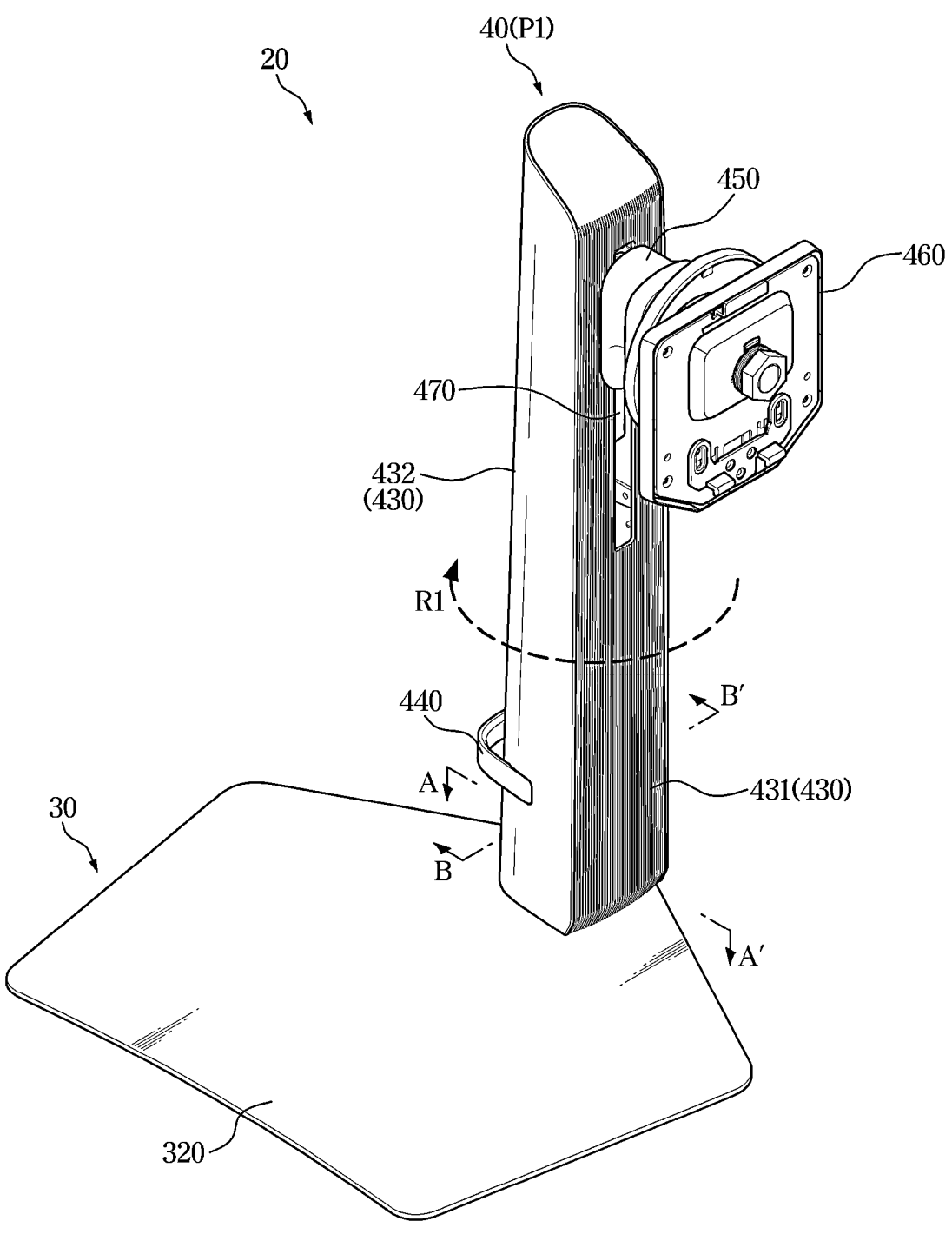

FIG. 17 shows an example of a state in which a stand neck is inserted in a stand base.

Figure 18:
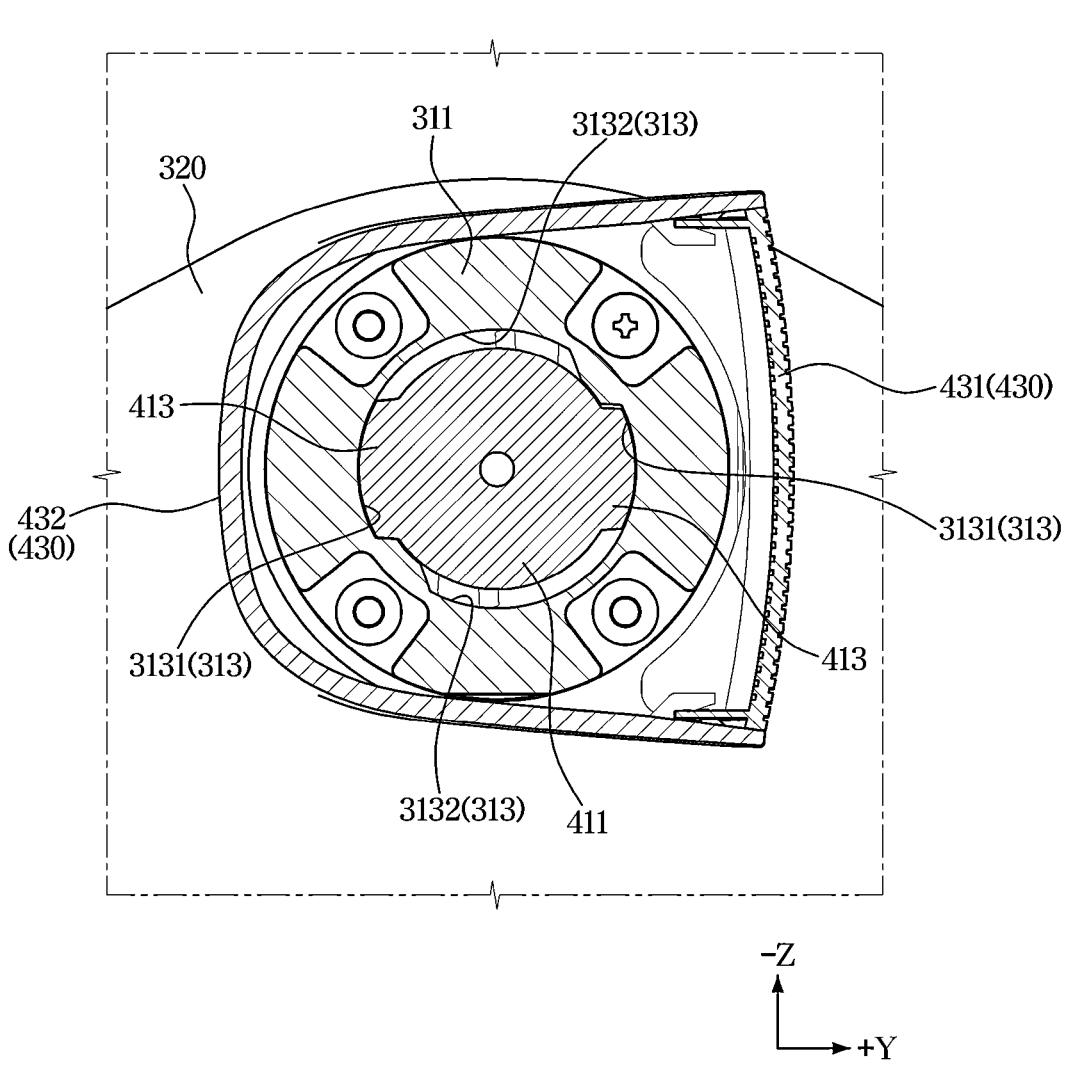

FIG. 18 is a cross-sectional view taken along line A-A' of FIG. 17.

Figure 19:
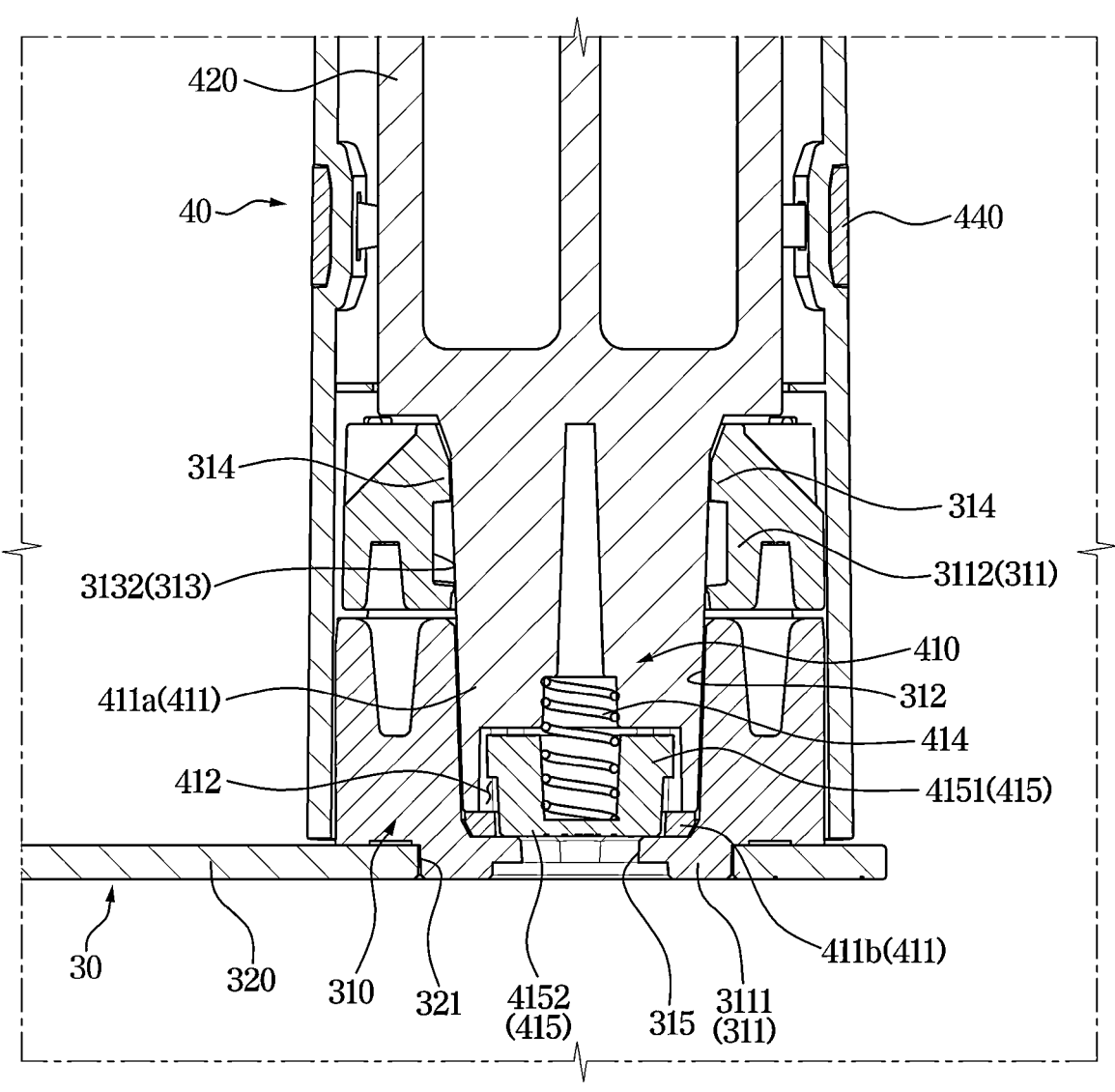

FIG. 19 is a cross-sectional view taken along line B-B' of FIG. 17.

Figure 20:
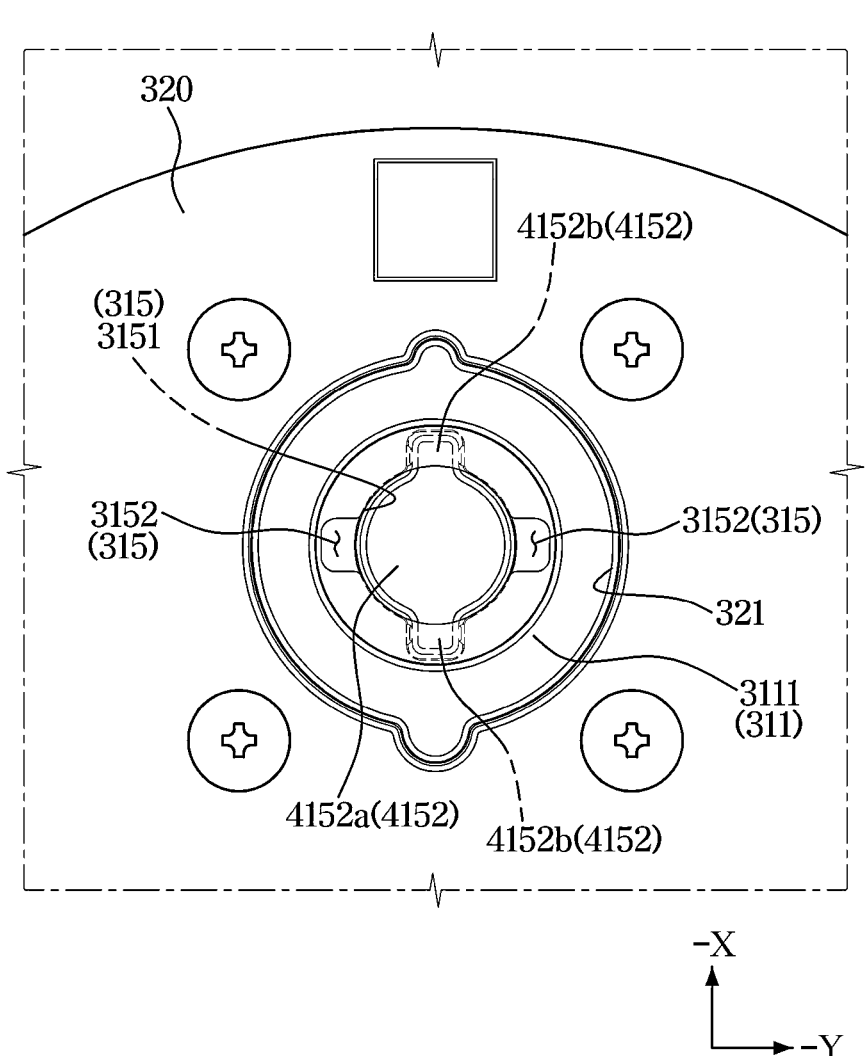

FIG. 20 is an enlarged view showing parts of bottoms of the stand neck and the stand base shown in FIG. 17.

Figure 21:
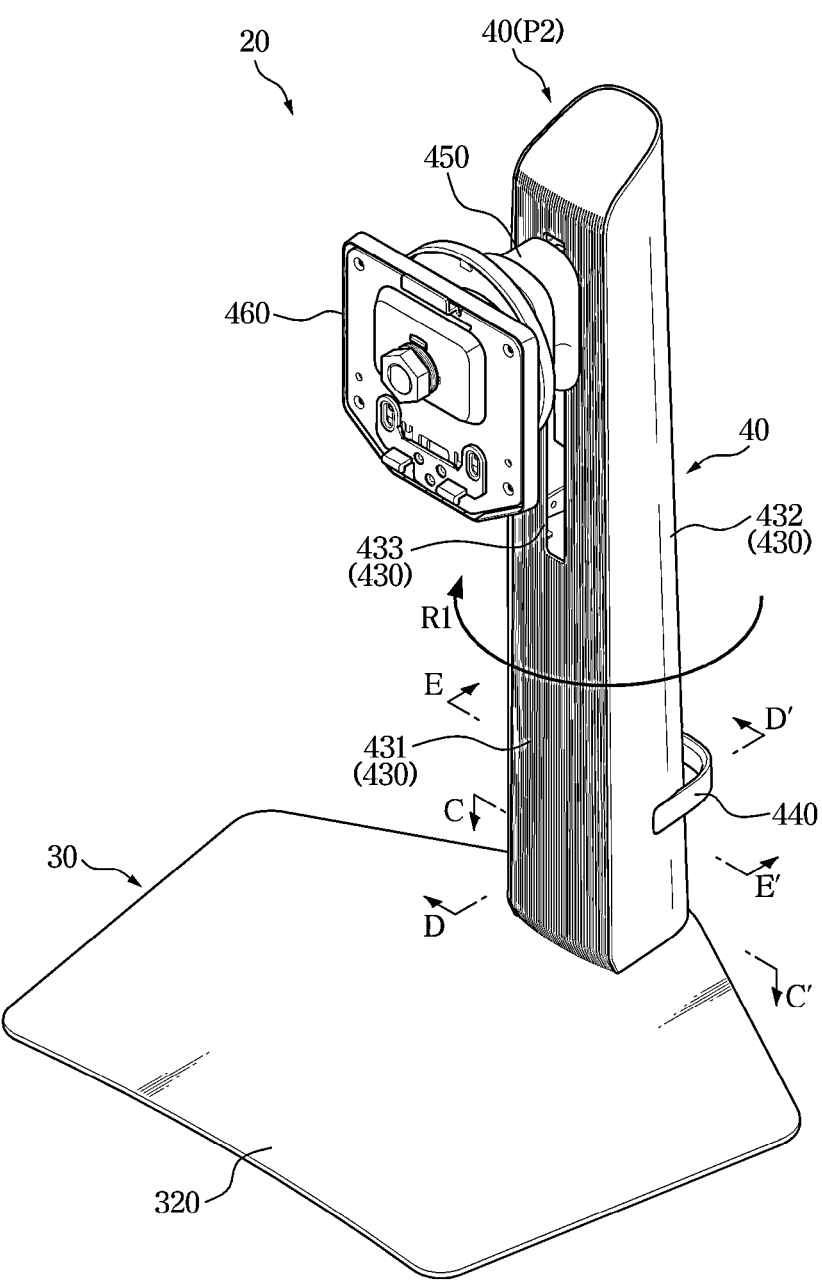
Figure 21:
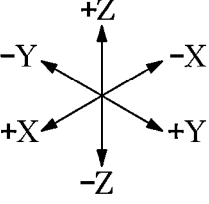

FIG. 21 shows an example of a state in which a stand neck is inserted in a stand base and then rotates in a first direction with respect to the stand base.

Figure 22:
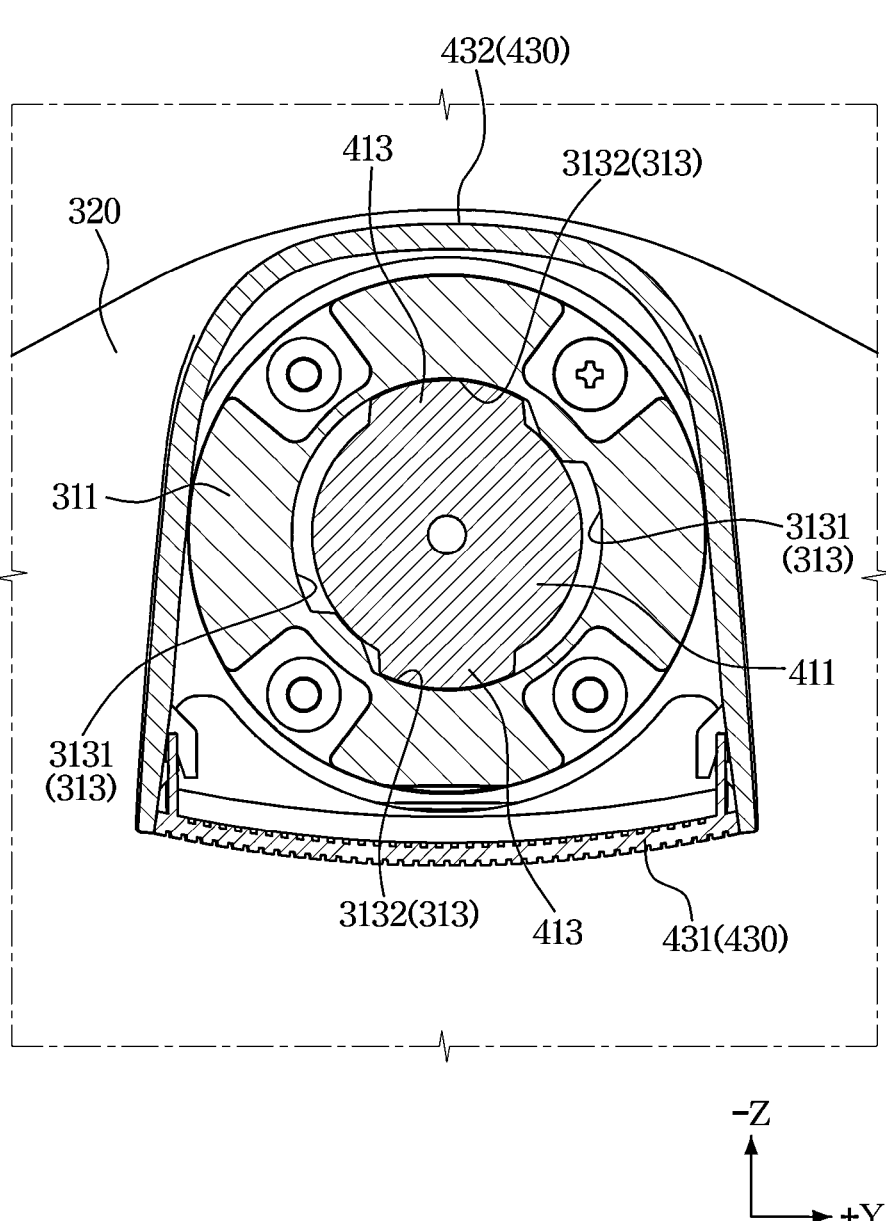

FIG. 22 is a cross-sectional view taken along line C-C' of FIG. 21.

Figure 23:
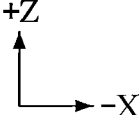

FIG. 23 is a cross-sectional view taken along line D-D' of FIG. 21.

Figure 24:
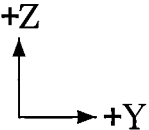

FIG. 24 is a cross-sectional view taken along line E-E' of FIG. 21.

Figure 25:
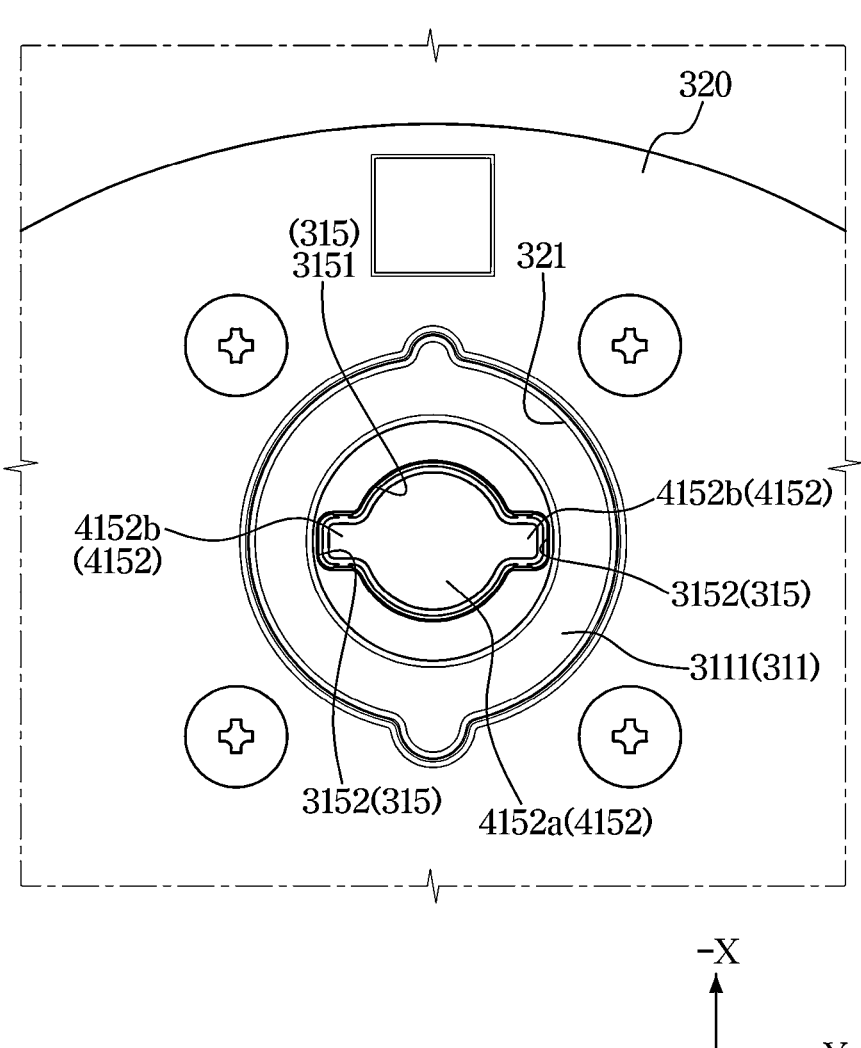

FIG. 25 is an enlarged view showing parts of bottoms of the stand base and the stand neck shown in FIG. 21.

Figure 26:
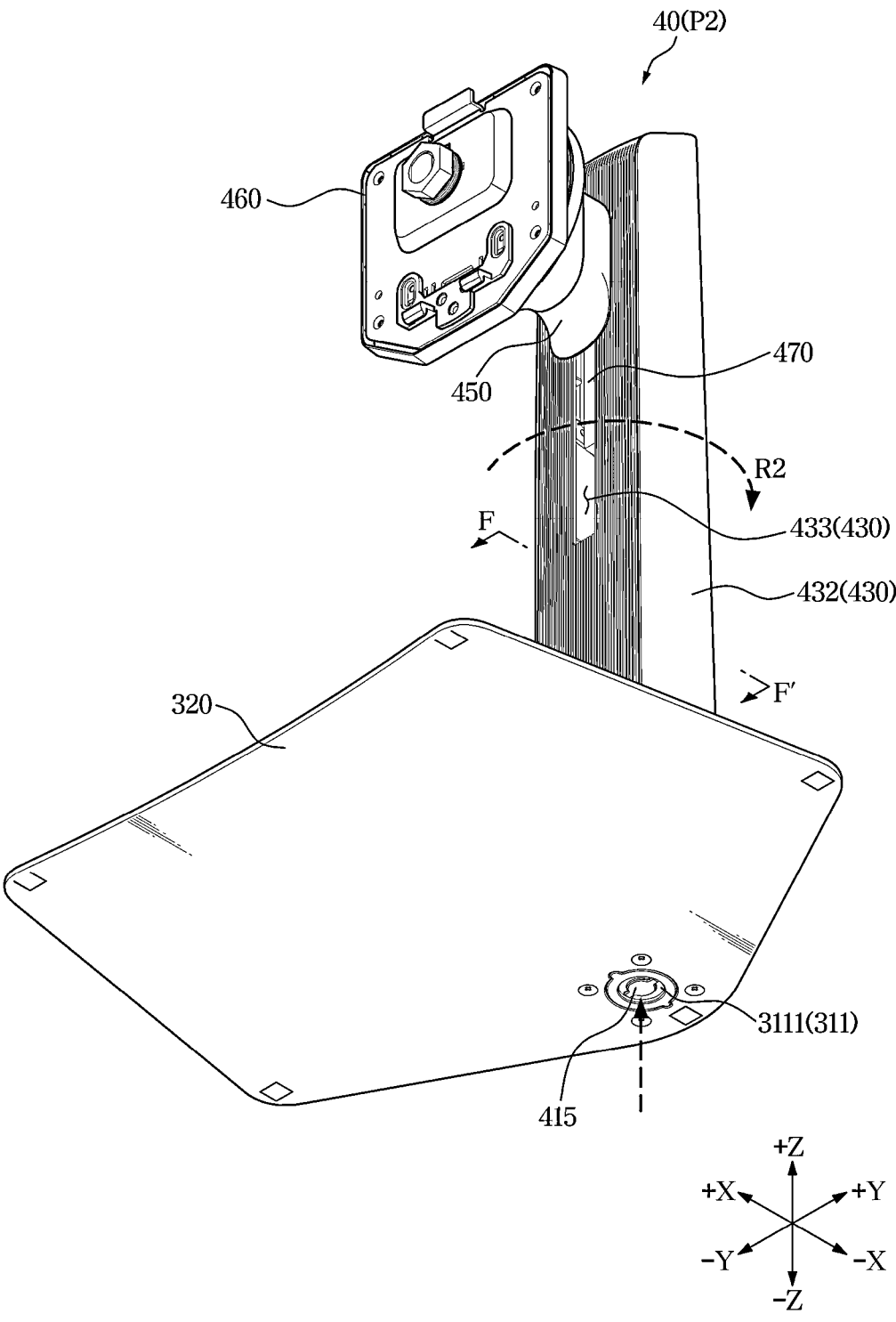

FIG. 26 is a bottom perspective view of a supporting device according to an embodiment.

Figure 27:
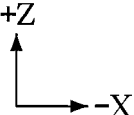

FIG. 27 shows an example of a state in which an elastic block is pressed, in a cross-sectional view taken along line F-F' of FIG. 26.

Figure 28:
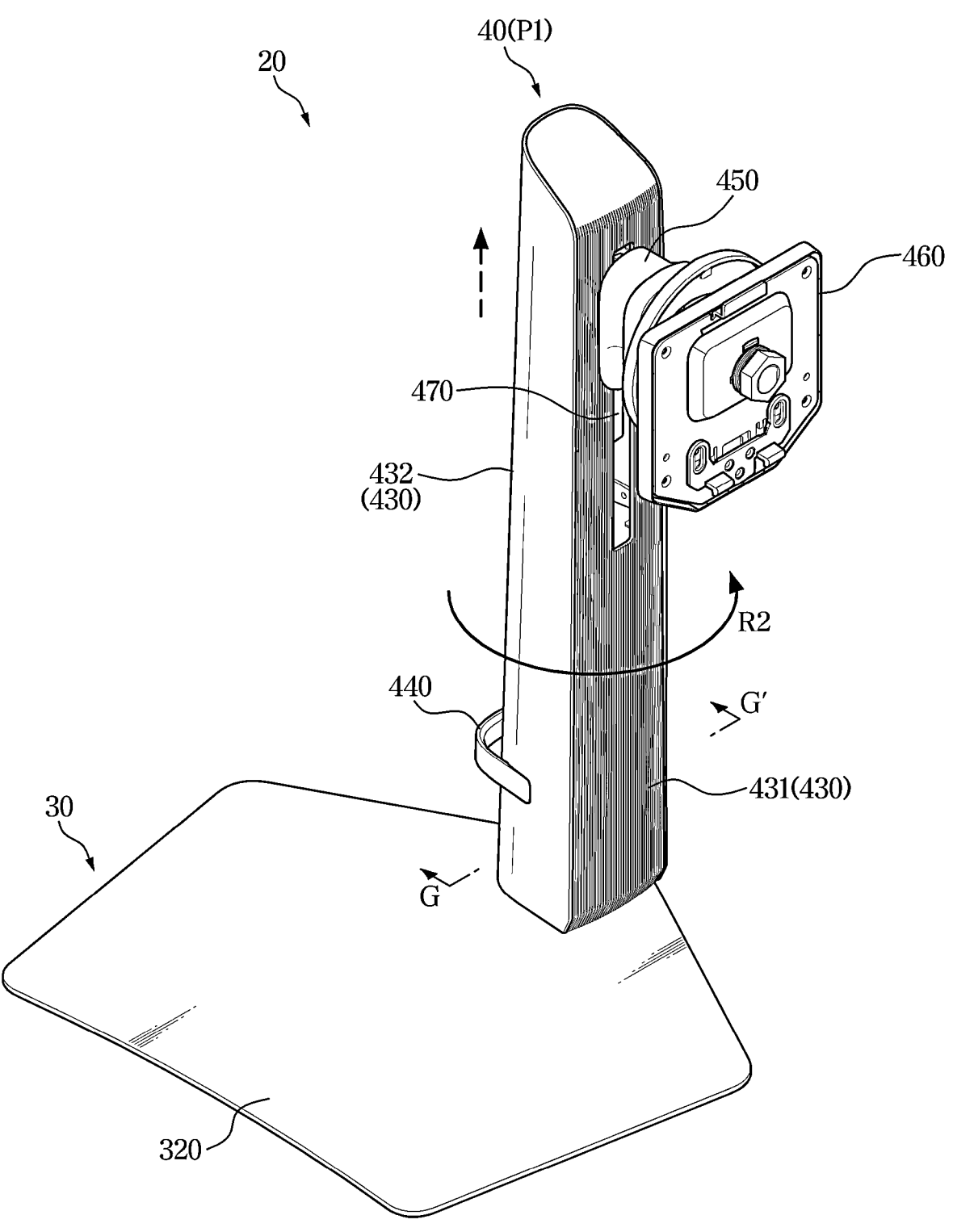

FIG. 28 shows an example of a state in which an elastic block is pressed and a stand neck rotates in a second direction with respect to the stand base.

Figure 29:
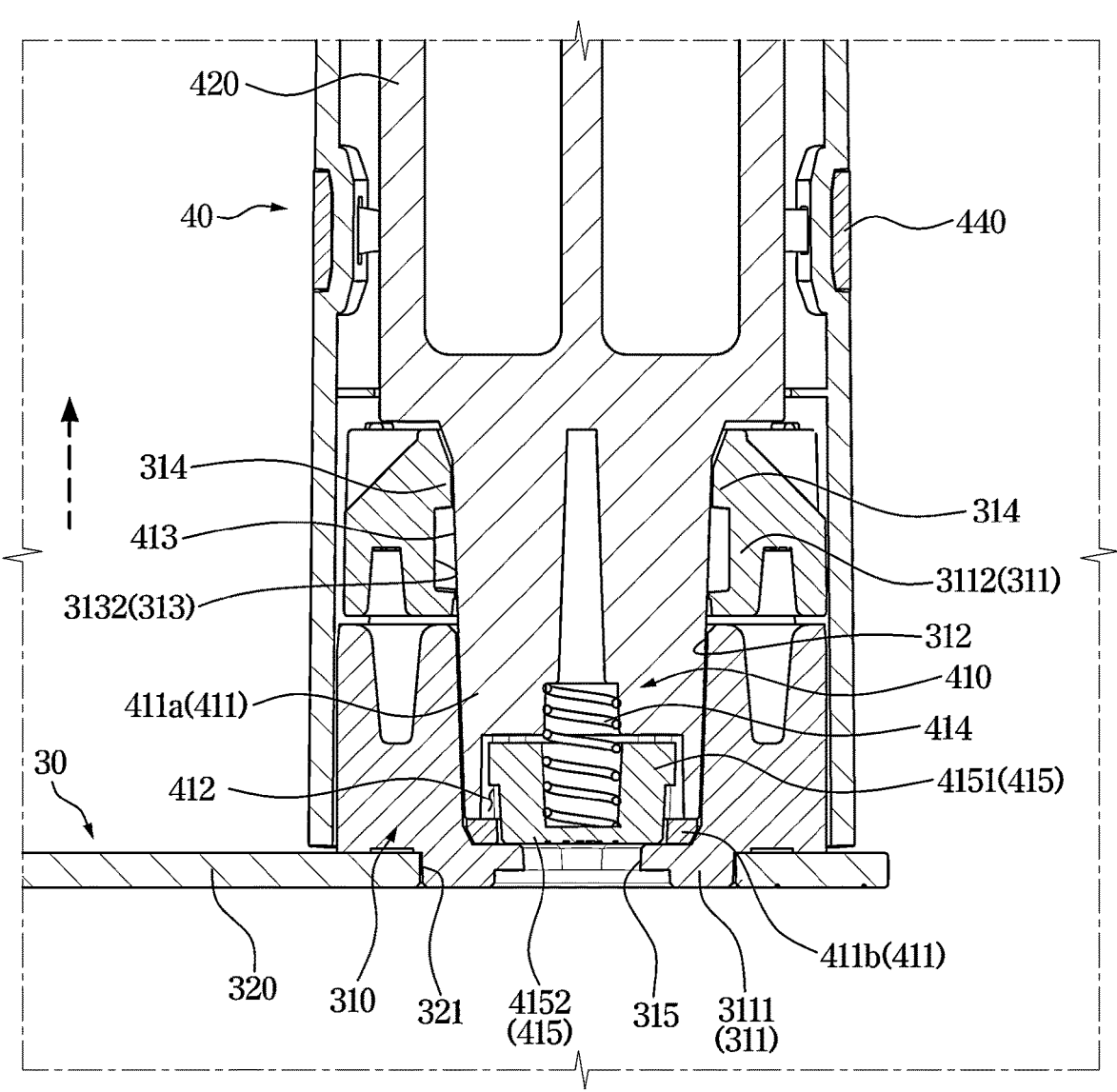

FIG. 29 is a cross-sectional view taken along line G-G' of FIG. 28.

Figure 30:

FIG. 30 shows an example of a state in which a stand neck is separated from a stand base.

MODES OF THE INVENTION

It should be appreciated that various embodiments of the present document and the terms used therein are not intended to limit the technological features set forth herein to particular embodiments and include various changes, equivalents, or replacements for the corresponding embodiments.

With regard to the description of the drawings, similar reference numerals may be used to refer to similar or related components.

Singular forms of nouns corresponding to items may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

The term "and/or" includes any and all combinations of one or more of a plurality of associated listed components.

As used herein, the terms "portion", "part, "module, or "member" may be implemented as software or hardware, and according to embodiments, a plurality of "portions", "parts, "modules, or "members" may be implemented as a single component, or a single "portion", "part, "module, or "member" may include a plurality of components.

As used herein, such terms as "1st" or "2nd" or "first" or "second" may be used to simply distinguish a corresponding component from another, and does not limit the components in another aspect (for example., importance or order).

It is to be understood that if a certain component (for example, a first component) is referred to, with or without the term "operatively" or "communicatively", as "coupled with," "coupled to," "connected with," or "connected to" another component (for example, a second component), it means that the component may be coupled with the other component directly (for example, by wire), wirelessly, or via a third element.

It is to be understood that the terms such as "including" or "having," etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a certain component is referred to as being "on" or "over" another component, it can be directly on the other component or intervening components may also be present.

In the following description, the terms "front", "rear", "upper", "lower", "left", "right", "vertical direction", etc. are defined based on the drawings. For example, a direction in which a display apparatus 1 shown in FIG. 1 displays images may be referred to as a front direction (+X direction), and an opposite direction of the front direction may be referred to as a rear direction (−X direction). However, the shapes and positions of the components are not limited by the terms.

Hereinafter, an embodiment of the disclosure will be described in detail with reference to the accompanying drawings.

Figure 1:
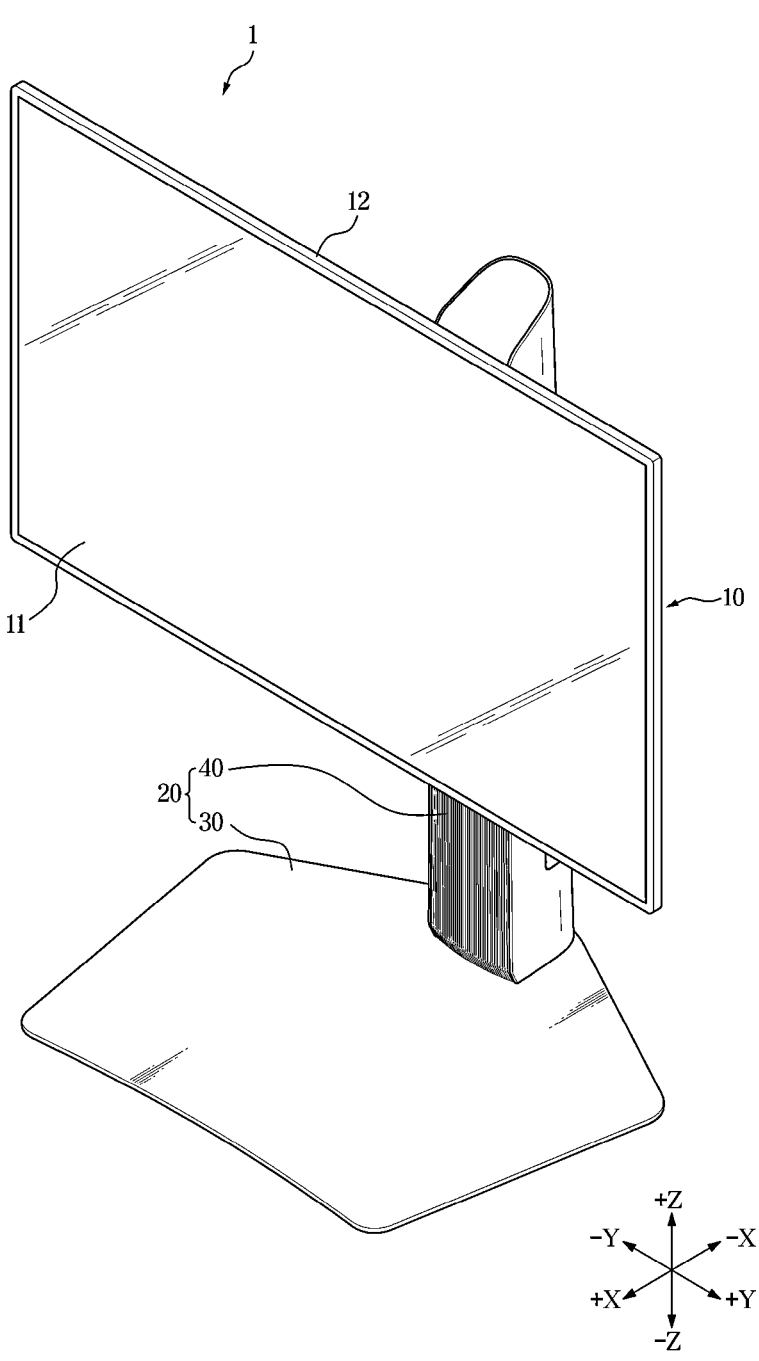
FIG. 1 is a perspective view of a display apparatus according to an embodiment.
Figure 2:
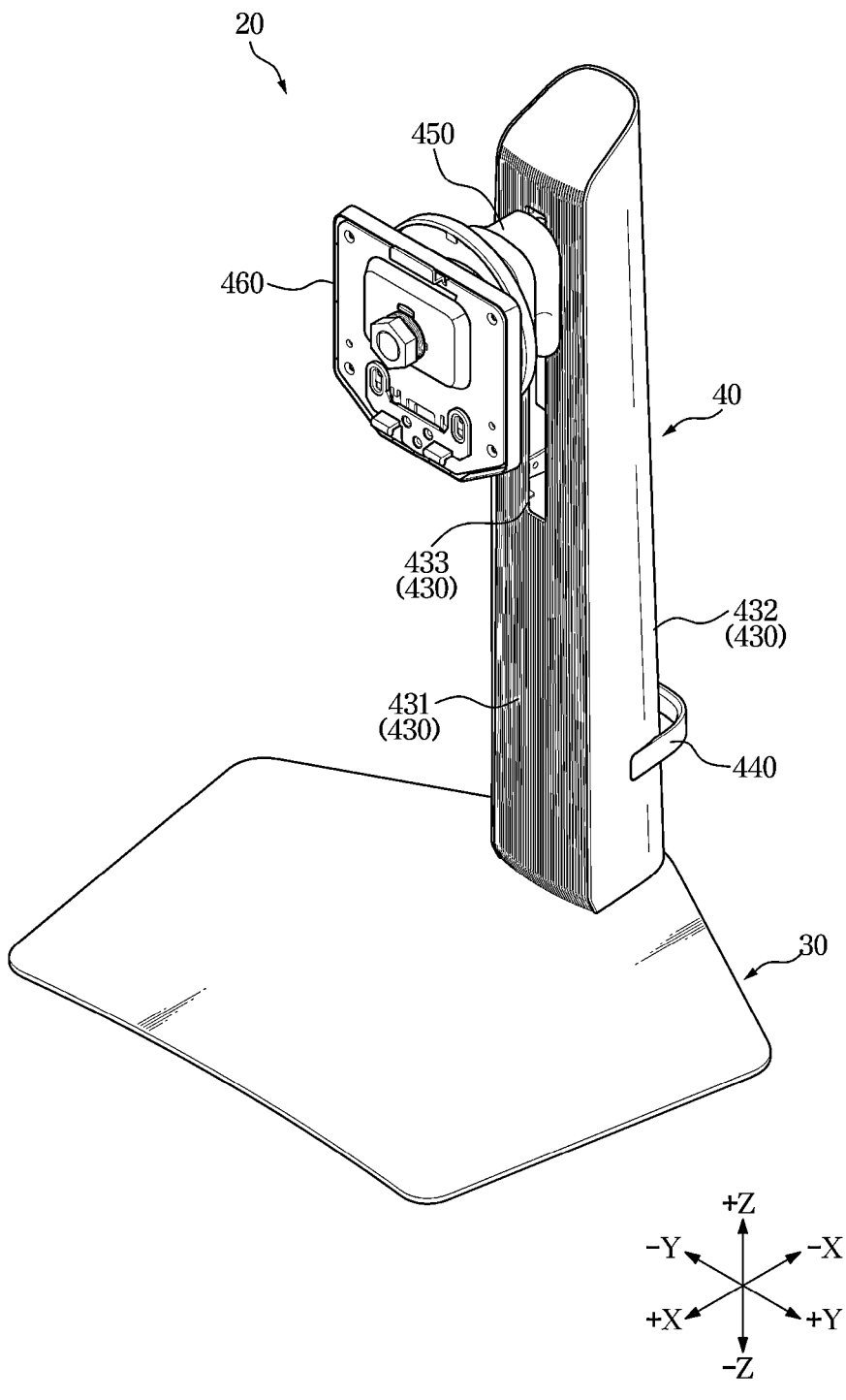
FIG. 2 is a perspective view of a supporting device according to an embodiment.

FIG. 1 is a perspective view of a display apparatus according to an embodiment. FIG. 2 is a perspective view of a supporting device according to an embodiment.

Referring to FIG. 1, a display apparatus 1 may include a display 10. The display 10 may be a device for displaying information, data, etc. as characters, figures, graphs, and images. For example, the display 10 may be implemented as a monitor, a television, a smart phone, a tablet PC, etc.

The display 10 may include a display panel 11 on which images are displayed. In a front side of the display panel 11, a screen display area may be formed. In the screen display area, a plurality of pixels may be formed, and a screen displayed on the screen display area may be formed by a combination of light emitted from the plurality of pixels. For example, light emitted from the plurality of pixels may be combined like a mosaic to form a screen on the screen display area.

The display panel 11 may include a self-emissive display panel such as an Organic Light-Emitting Diode (OLED) panel or a non-emissive display panel such as a Liquid Crystal Display (LCD). However, the kind of the display panel 11 is not limited thereto, and the display 10 may include various types of display panels 11.

The display 10 may include a cover 12. The cover 12 may cover a rear side of the display panel 11. The cover 12 may support and/or fix the display panel 11. Components for performing various functions of the display 10 may be accommodated in the cover 12. For example, the cover 12 may be provided in the form of an assembly into which a plurality of components are coupled. The cover 12 may be referred to as a chassis, a mold, a housing, etc.

The cover 12 may be connected to a stand neck 40 of a supporting device 20 which will be described below. The cover 12 may be supported by the stand neck 40 of the supporting device 20.

Meanwhile, in the drawings, the display 10 is shown to be a flat type display, although not limited thereto. However, the display 10 may be a curved display, or a bendable or flexible display capable of changing between a flat state and a curved state.

Referring to FIG. 2, the display apparatus 1 may include the supporting device 20 that supports the display 10. The supporting device 20 is also called a stand.

The supporting device 20 may include a stand base 30 and the stand neck 40. The stand neck 40 may be detachably coupled with the stand base 30. The stand neck 40 may be coupled with the stand base 30 by rotating with respect to the stand base 30.

The stand base 30 may be placed on a floor.

The stand neck 40 may be supported by the stand base 30. The stand neck 40 may be connectable to the rear side of the display 10.

Figure 3:
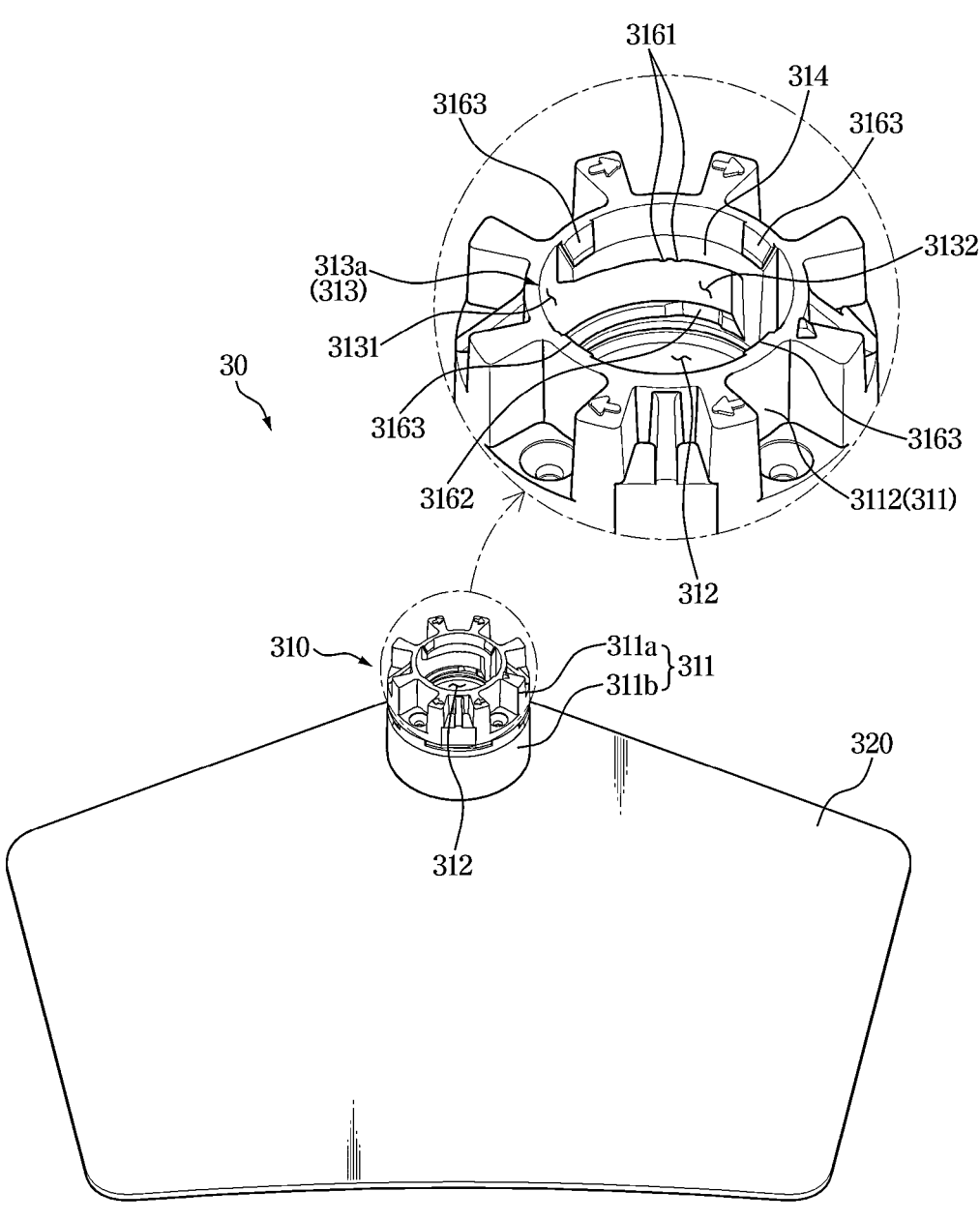
FIG. 3 is a perspective view of a stand base according to an embodiment.
Figure 4:
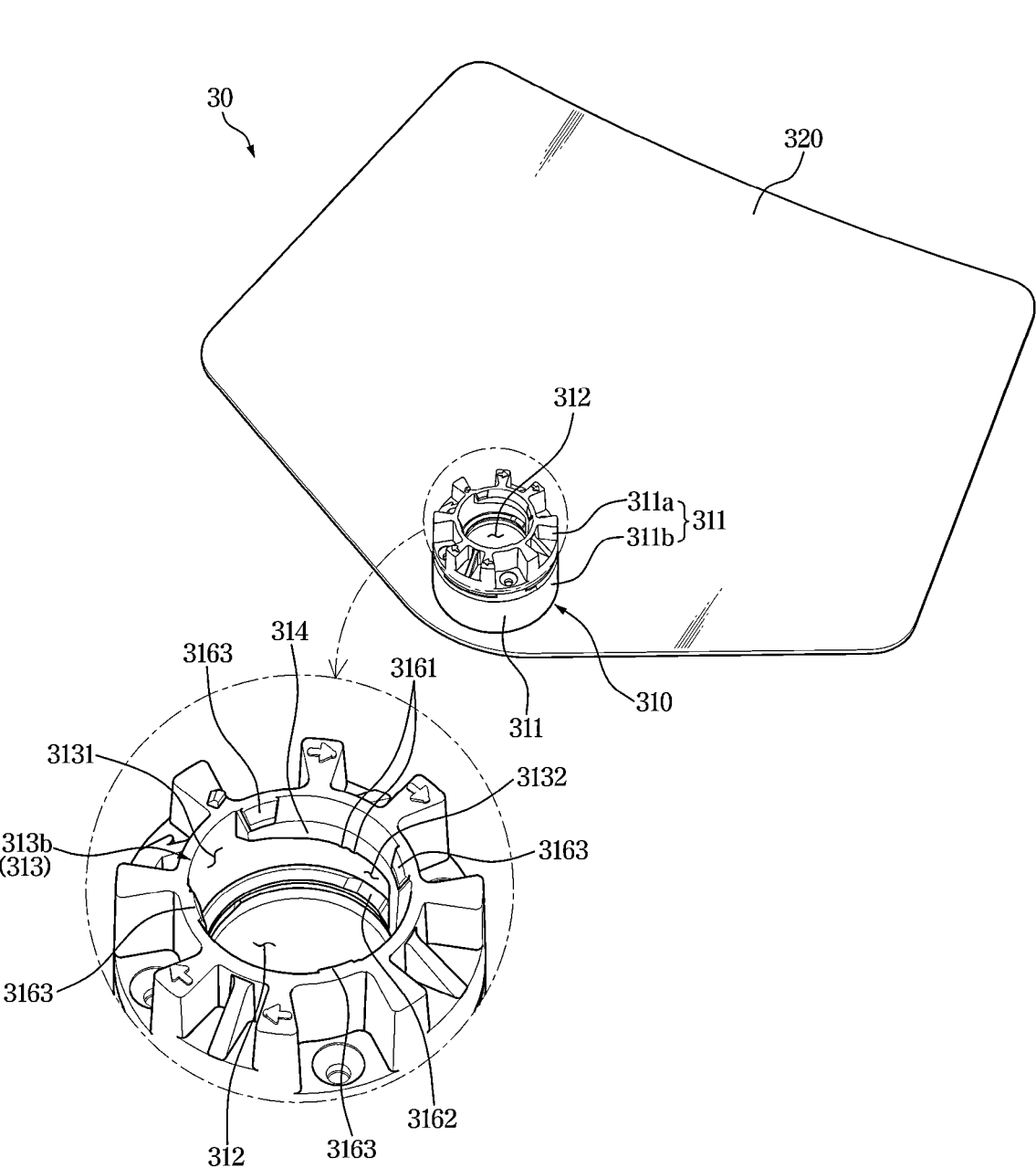
FIG. 4 is a perspective view showing the stand base shown in FIG. 3 in another direction.
Figure 5:
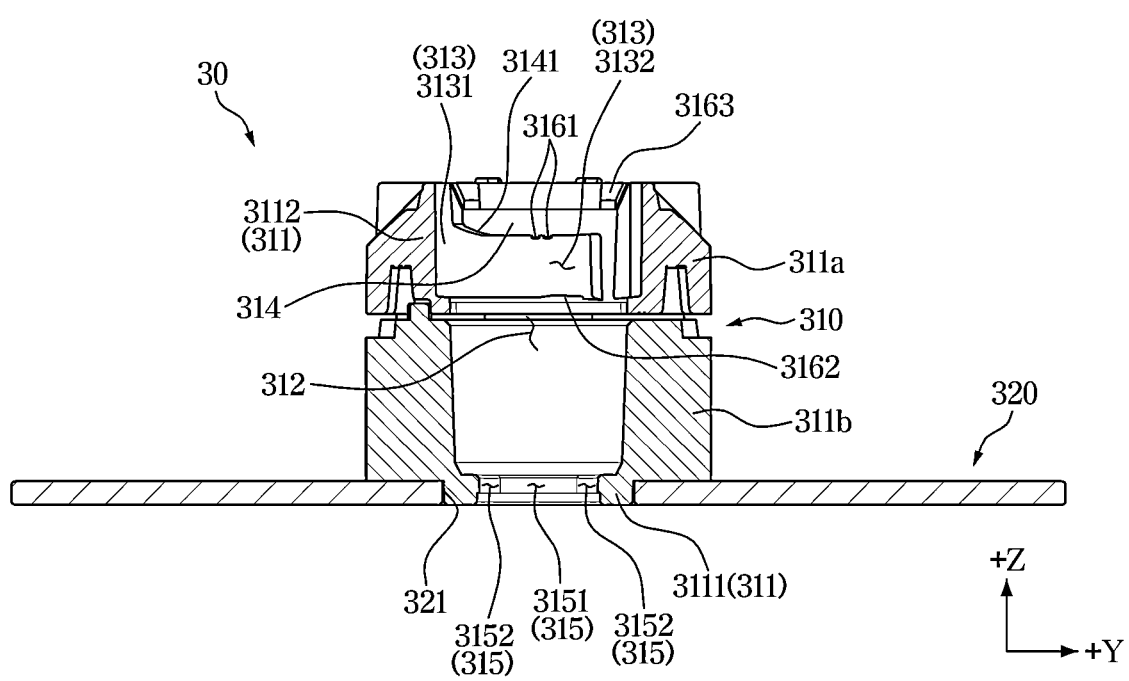
FIG. 5 is a cross-sectional view of the stand base shown in FIG. 3.
Figure 6:
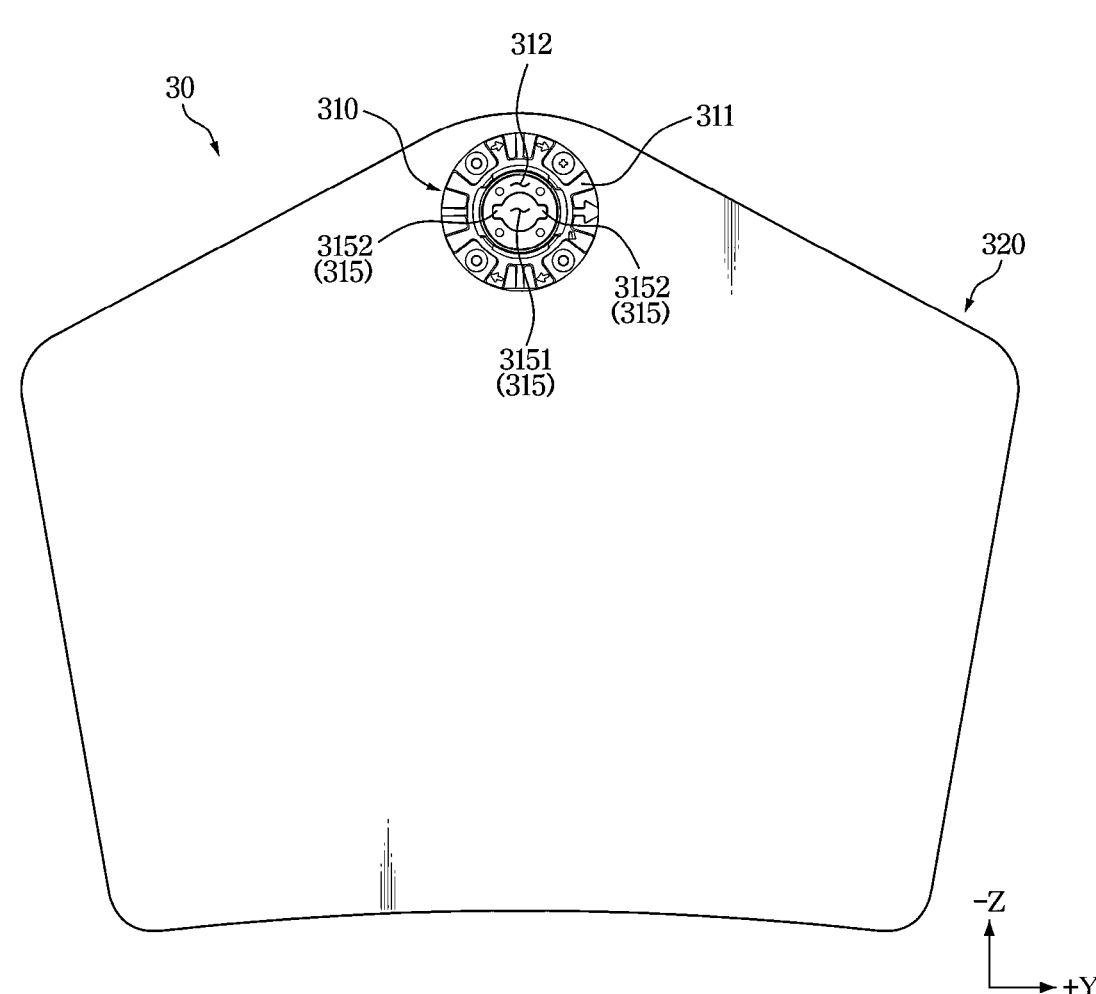
FIG. 6 is a top view of the stand base shown in FIG. 3.
Figure 7:
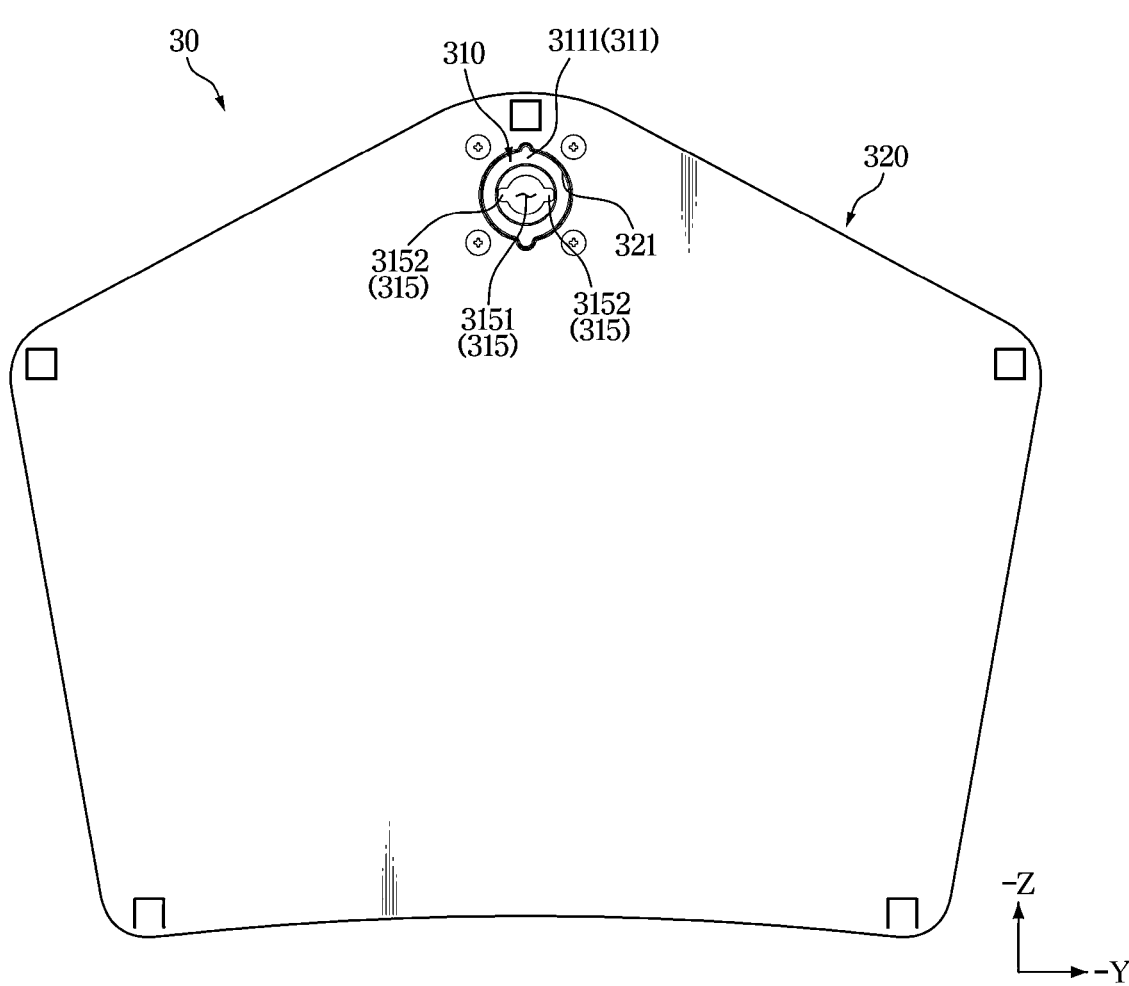
FIG. 7 is a bottom view of the stand base shown in FIG. 3.

FIG. 3 is a perspective view of a stand base according to an embodiment. FIG. 4 is a perspective view showing the stand base shown in FIG. 3 in another direction. FIG. 5 is a cross-sectional view of the stand base shown in FIG. 3. FIG. 6 is a top view of the stand base shown in FIG. 3. FIG. 7 is a bottom view of the stand base shown in FIG. 3.

The stand base 30 may include a base panel 320. The base panel 320 may be supported by the floor. For example, the base panel 320 may substantially have a plate shape.

The stand base 30 may include a first coupling portion 310. The first coupling portion 310 of the stand base 30 may correspond to a second coupling portion 410 (see FIGS. 10 to 13) of the stand neck 40 which will be described below. The first coupling portion 310 of the stand base 30 may be couplable to the second coupling portion 410 of the stand neck 40 which will be described below.

The first coupling portion 310 may protrude upward from the base panel 320. For example, the first coupling portion 310 may have a substantially cylindrical shape.

The first coupling portion 310 may be detachably coupled with the base panel 320. For example, the first coupling portion 310 may be detachably coupled with a panel hole 321 (see FIGS. 5 and 7) formed in the base panel 320. However, the disclosure is not limited thereto, and the first coupling portion 310 may be integrated into the base panel 320.

The first coupling portion 310 may include a first coupling body 311.

For example, the first coupling body 311 may include a first upper portion 311*a* and a first lower portion 311*b* detachably coupled with a lower part of the first upper portion 311*a*. However, the disclosure is not limited thereto, and the first upper portion 311*a* and the first lower portion 311*b* may be integrated into one body.

For example, the first coupling body 311 may include a bottom portion 3111 and a side wall portion 3112 extending from the bottom portion 3111. The bottom portion 3111 may include a part coupled with the base panel 310. The side wall portion 3112 may include a part protruding from an upper surface of the base panel 320. The bottom portion 3111 may be formed by a part of the first lower portion 311*b*, and the side wall portion 3112 may be formed by another part of the first lower portion 311*b* and the first upper portion 311*a*. However, the disclosure is not limited thereto, and the side wall portion 3112 may be integrated into one body.

The first coupling body 311 may have a hollow shape. A first hollow part 312 may be formed inside the first coupling body 311. The first hollow part 312 may be formed by the side wall part 312. The first hollow part 312 may be a space surrounded by the side wall portion 3112.

The first coupling portion 310 may include a coupling groove 313. The coupling groove 313 may be formed in an inner side surface of the first coupling body 311. The coupling groove 313 may be formed in an inner side surface of the side wall portion 3112. The coupling groove 313 may guide a coupling protrusion 413 of the second coupling portion 410 which will be described below.

The coupling groove 313 may include a first groove portion 3131 and a second groove portion 3132. The second groove portion 3132 may extend from the first groove portion 3131. The second groove portion 3132 may extend from a lower part of the first groove portion 3131. The second groove portion 3132 may extend from the first groove portion 3131 along a rotation direction of the stand neck 40.

In the drawings, the first coupling portion 310 is shown to include two coupling grooves 313*a* and 313*b*. However, the disclosure is not limited thereto, and the first coupling portion 310 may include a single coupling groove. The first coupling portion 310 may include three coupling grooves or more. The number of the coupling groove 313 may be equal to the number of the coupling protrusion 413. The number of the coupling groove 313 is not limited.

The first coupling portion 310 may include a locking protrusion 314. The locking protrusion 314 may be formed on the inner side surface of the first coupling body 311. The locking protrusion 314 may be formed on the inner side surface of the side wall portion 3112. The locking protrusion 314 may be formed adjacent to the coupling groove 313 to prevent the coupling protrusion 413 of the second coupling portion 410 from departing from the coupling groove 313. While the coupling protrusion 413 is coupled with the coupling groove 313, the coupling protrusion 413 may not be separated from the coupling groove 313 by the locking protrusion 314. For example, while the coupling protrusion 413 is coupled with the coupling groove 313, the locking protrusion 314 may be in contact with an upper side 4132 of the coupling protrusion 413 to prevent the coupling protrusion 413 from departing from the coupling groove 313 (see FIG. 24).

For example, the locking protrusion 314 may be positioned above the second groove portion 3132. For example, as the coupling groove 313 is depressed from the inner side surface of the first coupling body 311, the locking protrusion 314 may protrude relative to the coupling groove 313. In contrast, for example, as the locking protrusion 314 protrudes from the inner side surface of the first coupling body 311, the coupling groove 313 may be depressed relative to the locking protrusion 314.

The locking protrusion 314 may include a first inclined portion 3141. The first inclined portion 3141 may be inclined downward from the first groove portion 3131 toward the second groove portion 3132. The coupling protrusion 413 may be smoothly guided from the first groove portion 3131 to the second groove portion 3132 by the first inclined portion 3141.

The first coupling portion 310 may include a coupling hole 315. The coupling hole 315 may be formed in the first coupling body 311. For example, the coupling hole 315 may penetrate the bottom portion 3111 of the first coupling body 311. The coupling hole 315 may communicate with the first hollow part 312.

The coupling hole 315 may correspond to an elastic block 415 of the second coupling portion 410 which will be described below. The coupling hole 315 may have a shape corresponding to a protruding body 4152 of the elastic block 415 which will be described below.

The coupling hole 315 may include a first hole area 3151 and a second hole area 3152. The first hole area 3151 may correspond to a first protrusion 4152*a* of the elastic block 415 which will be described below. The second hole area 3152 may correspond to a second protrusion 4152*b* of the elastic block 415 which will be described below.

Figure 9:
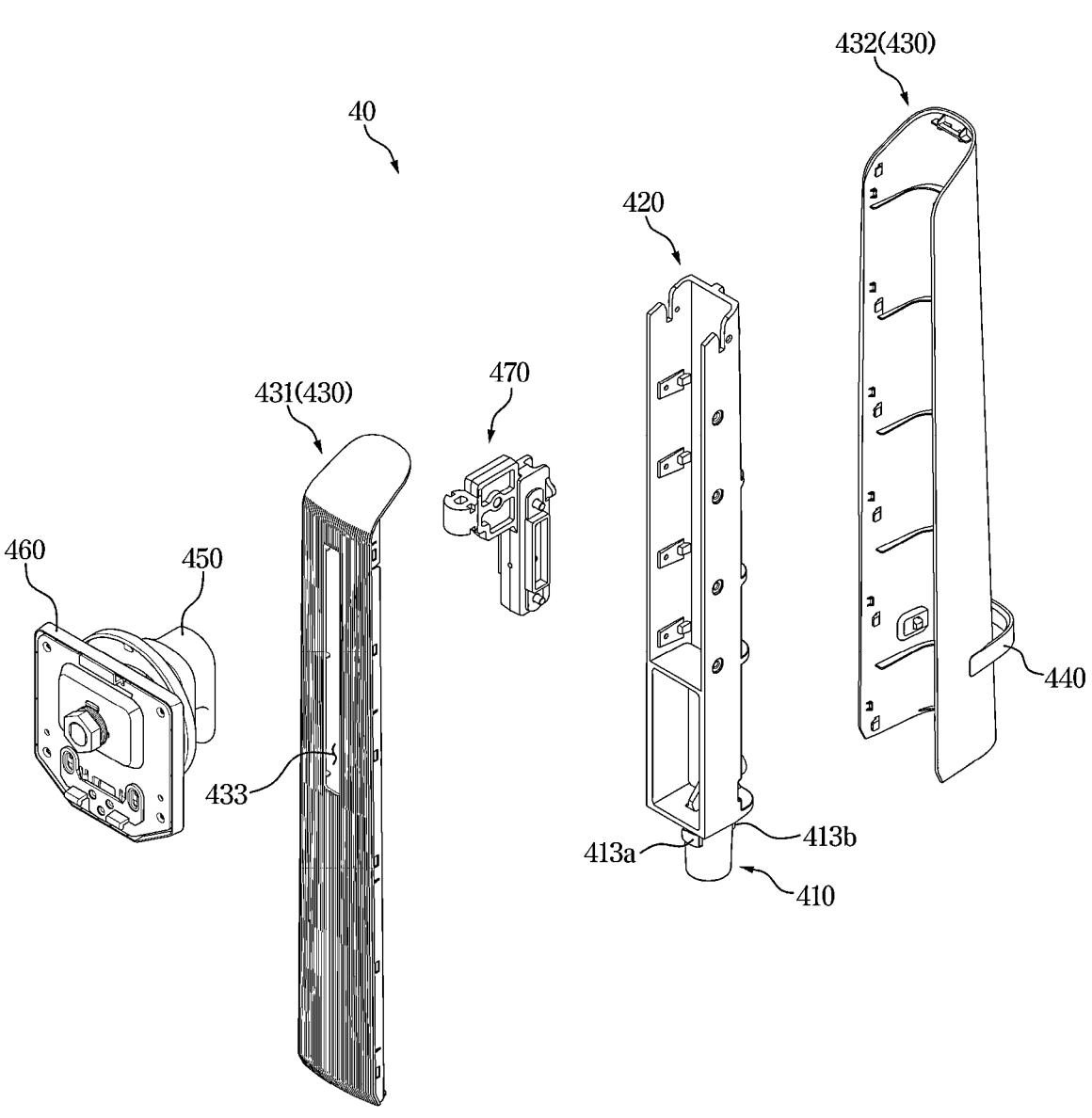
FIG. 9 is an exploded view of the stand neck shown in FIG. 8.

FIG. 8 is a perspective view of a stand neck according to an embodiment. FIG. 9 is an exploded view of the stand neck shown in FIG. 8. FIG. 10 is an exploded view of the stand neck shown in FIG. 8. FIG. 11 is a front view of a frame according to an embodiment. FIG. 12 is a bottom perspective view of a frame according to an embodiment. FIG. 13 is an exploded view of a coupling portion of a stand neck according to an embodiment.

The stand neck 40 may include a frame 420. The frame 420 may support and/or fix components of the stand neck 40. The frame 420 may extend in a substantially vertical direction. The frame 420 may include the second coupling portion 410. The second coupling portion 410 may form a low portion of the frame 420. However, the disclosure is not limited thereto, and the second coupling portion 410 may be a component that is separated from the frame 420.

The stand neck 40 may include a case 430. The case 430 may cover the frame 420. The case 430 may cover the second coupling portion 410.

For example, the case 430 may include a front case 431 and a rear case 432 detachably coupled with the front case 431. However, the disclosure is not limited thereto, and the front case 431 and the rear case 432 may be integrated into one body.

The stand neck 40 may include a handle 440. The handle 440 may be detachably coupled with the case 430. The handle 440 may be detachably coupled with the rear case 432. However, the disclosure is not limited thereto, and the handle 440 may be integrated into the case 430.

The stand neck 40 may include a supporting arm 450. The supporting arm 450 may support a rear side of the display 10 (see FIG. 1). The supporting arm 450 may be positioned outside the case 430.

The stand neck 40 may include a bracket 460. The bracket 460 may be provided in front of the supporting arm 450. The display 10 may be detachably coupled with the bracket 460. The bracket 460 may be connected to the rear side of the display 10. However, the disclosure is not limited thereto, and the bracket 460 may be provided as a component of the display 10 and detachably coupled with the supporting arm 450 of the stand neck 40.

The bracket 460 and the display 10 coupled with the bracket 460 may be pivotable on the supporting arm 450. The bracket 460 and the display 10 coupled with the bracket 460 may be tiltable with respect to the supporting arm 450.

The stand neck 40 may include a lifting member 470. The lifting member 470 may move the supporting arm 450 in a vertical direction with respect to the frame 420. The lifting member 470 may move along a rail 433 formed in the case 430. Accordingly, the display 10 supported by the supporting device 20 may move in the vertical direction with respect to the frame 420 by the lifting member 470. The display 10 supported by the supporting device 20 may move in the vertical direction with respect to the case 430 by the lifting member 470.

The stand neck 40 may include the second coupling portion 410. The second coupling portion 410 of the stand neck 40 may correspond to the first coupling portion 310 of the stand base 30. The second coupling portion 410 of the stand neck 40 may be couplable with the first coupling portion 310 of the stand base 30. The second coupling portion 410 may be rotatably coupled with the first coupling portion 310. Meanwhile, in the drawings, the second coupling portion 410 is shown to be a component of the frame 420. However, the disclosure is not limited thereto, and the second coupling portion 410 may be provided as a component that is separated from the frame 420.

The second coupling portion 410 may include a second coupling body 411. The second coupling body 411 may be insertable into the first coupling body 311. The second coupling body 411 may correspond to the first hollow part 312. The second coupling body 411 may be insertable into the first hollow part 312.

For example, the second coupling body 411 may include a second upper portion 411*a* and a second lower portion 411*b* detachably coupled with a lower part of the second upper portion 411*a*. For example, the second upper portion 411*a* may open at the lower side, and the second lower portion 411*b* may cover a part of the lower side of the second upper portion 411*a*. However, the disclosure is not limited thereto, and the second upper portion 411*a* and the second lower portion 411*b* may be integrated into one body.

The second coupling body 411 may include a body hole 411*h*. For example, the body hole 411*h* may penetrate the second lower portion 411*b*.

The second coupling body 411 may have a hollow shape. A second hollow part 412 may be formed inside the second coupling body 411. For example, the second hollow part 412 may be formed by the second upper portion 411*a*. For example, the second hollow part 412 may be a space surrounded by the second upper portion 411*a*.

The second coupling portion 410 may include a coupling protrusion 413. The coupling protrusion 413 may be formed on an outer side surface of the second coupling body 411. The coupling protrusion 413 may protrude from the outer side surface of the second coupling body 411.

The coupling protrusion 413 may be guided by the coupling groove 313 of the first coupling portion 310. While the stand neck 40 rotates with respect to the stand base 30, the coupling protrusion 413 may be guided by the coupling groove 313, which will be described below. While the stand neck 40 rotates with respect to the stand base 30, the coupling protrusion 413 may move inside the coupling groove 313. While the stand neck 40 rotates with respect to the stand base 30, the coupling protrusion 413 may move between the first groove portion 3131 and the second groove portion 3132.

The coupling protrusion 413 may be couplable with the coupling groove 313. The coupling protrusion 413 may be coupled with the coupling groove 313 by rotating with respect to the coupling groove 313.

According to the coupling protrusion 413 being positioned at the first groove portion 3131 of the coupling groove 313, the coupling protrusion 413 may be separated from the coupling groove 313. According to the coupling protrusion 413 being positioned at the second groove portion 3132 of the coupling groove 313, the coupling protrusion 413 may be caught by the locking protrusion 314 not to be separated from the coupling groove 313. Details about this will be described below.

The coupling protrusion 413 may include a second inclined portion 4131. The second inclined portion 4131 may correspond to the first inclined portion 3141. Accordingly, the coupling protrusion 413 may smoothly move between the first groove portion 3131 and the second groove portion 3132. More specifically, the coupling protrusion 413 may more easily enter the second groove portion 3132 from the first groove portion 3131.

In the drawings, the second coupling portion 410 is shown to include two coupling protrusions 413*a* and 413*b*. However, the disclosure is not limited thereto. The second coupling portion 410 may include a single coupling protrusion. The second coupling portion 410 may include three coupling protrusions or more. The number of the coupling protrusion 413 may be equal to the number of the coupling groove 313. The number of the coupling protrusion 413 is not limited.

The coupling portion 410 may include a spring 414. The spring 414 may be accommodated inside the second coupling body 411. The spring 414 may be positioned in the second hollow part 412. The spring 414 may elastically bias the elastic block 415. The spring 414 may elastically bias the elastic block 415 in the substantially vertical direction.

The coupling portion 410 may include the elastic block 415. The elastic block 415 may be elastically biased by the spring 414. The elastic block 415 may be movable relative to the second coupling body 411 by the spring 414. The elastic block 415 may be connected to the second coupling body 411 and movable relative to the second coupling body 411. The elastic block 415 may move in the substantially vertical direction by the spring 414.

The elastic block 415 may be coupled with the second coupling body 411 to cover the spring 414. The elastic block 415 may be in contact with the spring 414. As the elastic block 415 is pressed, the spring 414 may also be pressed.

The elastic block 415 may include a locking body 4151 and a protruding body 4152 extending from a lower part of the locking body 4151. The locking body 4151 may be larger than the protruding body 4152.

The locking body 4151 may be accommodated inside the second coupling body 411. The locking body 4151 may be caught by the second coupling body 411. The locking body 4151 may be caught by the second lower portion 411*b*. A size of the locking body 4151 may be larger than a size of the body hole 411*h* of the second coupling body 411.

The protruding body 4152 may protrude from the second coupling body 411 through the body hole 411*h*. The protruding body 4152 may not be caught by the second coupling body 411. A size of the protruding body 4152 may be smaller than a size of the body hole 411*h* of the second coupling body 411. In some cases, the size of the protruding body

4152 may be equal to the size of the body hole 411*h* of the second coupling body 411. The size of the protruding body 4152 is not limited as long as the protruding body 4152 is capable of passing through the body hole 411*h*.

For example, while the elastic block 415 does not interfere with another component, the locking body 4151 may be accommodated inside the second coupling body 411, and the protruding body 4152 may protrude from the second coupling body 411 through the body hole 411*h*. For example, while the elastic block 415 interferes with another component or is pressed by an external force, the locking body 4151 may be accommodated inside the second coupling body 411 and at least one part of the protruding body 4152 may be accommodated inside the second coupling body 411. An area of the protruding body 4152 accommodated inside the second coupling body 411 may depend on a degree by which the elastic block 415 is pressed.

The elastic block 415 may correspond to the coupling hole 315 of the first coupling portion 310. The protruding body 4152 of the elastic block 415 may have a shape corresponding to the coupling hole 315. The protruding body 4152 of the elastic block 415 may be exposed to outside through the coupling hole 315.

The protruding body 4152 of the elastic block 415 may include a first protruding portion 4152*a* and a second protruding portion 4152*b*. The second protruding portion 4152*b* may extend outward from the first protruding portion 4252*a*. The first protruding portion 4152*a* may correspond to the first hole area 3151 of the coupling hole 315. The second protruding portion 4152*b* may correspond to the second hole area 3152 of the coupling hole 315.

The elastic block 415 may be engaged with the coupling hole 315. That the elastic block 415 is engaged with the coupling hole 315 may include that the protruding body 4152 is positioned inside the coupling hole 315. That the elastic block 415 is engaged with the coupling hole 315 may include that the first protruding portion 4152*a* is positioned inside the first hole area 3151 of the coupling hole 315 and the second protruding portion 4152*b* is positioned inside the second hole area 3152 of the coupling hole 315.

Meanwhile, configurations of the first coupling portion 310 and the second coupling portion 410 are not limited by the ordinals of "first" and "second". For example, the first coupling portion 310 may be referred to as a second coupling portion 310, and the second coupling portion 410 may be referred to as a first coupling portion 410. Likewise, components of the first coupling portion 310 and components of the second coupling portion 410 are also not limited by the ordinals of "first" and "second".

Hereinafter, an example of a process of coupling the stand neck 40 with the stand base 30 will be described with reference to FIGS. 14 to 25.

FIG. 14 shows an example of a state in which a stand neck is aligned with a stand base. FIG. 15 is an enlarged view showing some portions of the stand base and the stand neck shown in FIG. 14. FIG. 16 is an enlarged view showing parts of bottoms of the stand base and the stand neck shown in FIG. 14. For reference, to more clearly show the first coupling portion 310 of the stand base 30 and the second coupling portion 410 of the stand neck 40, the case 430 of the stand neck 40 is not shown in FIG. 15.

Referring to FIGS. 14 and 15, the stand neck 40 may be aligned in the substantially vertical direction with respect to the stand base 30. The second coupling portion 410 of the stand neck 40 may be aligned in the substantially vertical direction with respect to the first coupling portion 310 of the stand base 30. The stand neck 40 may be aligned with respect to the stand base 30 such that the coupling protrusion 413 of the second coupling portion 410 corresponds to the first groove portion 3131 of the coupling groove 313 of the first coupling portion 310.

FIG. 16 shows a state before the stand neck 40 is coupled with the stand base 30, that is, a state in which the elastic block 415 of the second coupling portion 410 is not coupled with the coupling hole 315 of the first coupling portion 310.

The stand neck 40 may be movable between a first position P1 (see FIGS. 17 to 20) and a second position P2 (see FIGS. 21 to 25).

FIG. 17 shows an example of a state in which a stand neck is inserted in a stand base. FIG. 18 is a cross-sectional view taken along line A-A' of FIG. 17. FIG. 19 is a cross-sectional view taken along line B-B' of FIG. 17. FIG. 20 is an enlarged view showing parts of bottoms of the stand neck and the stand base shown in FIG. 17.

Referring to FIG. 17, the stand neck 40 may be located at the first position P1 at which the second coupling portion 410 is separable from the first coupling portion 310. According to the stand neck 40 being located at the first position P1, the second coupling portion 410 may be separable from the first coupling portion 310. By moving the stand neck 40 located at the first position P1 upward, the second coupling portion 410 may be separated upward from the first coupling portion 310.

For example, the stand neck 40 may move downward in the state of being aligned with respect to the stand base 30 (see FIGS. 14 to 16) to thereby be located at the first position P1 (see FIGS. 17 to 20). The stand neck 40 may be located at the first position P1 by moving downward toward the stand base 30 such that the coupling protrusion 413 of the second coupling portion 410 corresponds to the first groove portion 3131 of the coupling groove 313 of the first coupling portion 310.

Referring to FIG. 18, while the stand neck 40 is located at the first position P1, the first groove portion 3131 may accommodate the coupling protrusion 413. While the stand neck 40 is located at the first position P1, the coupling protrusion 413 may be accommodated in the first groove portion 3131 without interfering with the locking protrusion 314 (see FIG. 20). Accordingly, while the stand neck 40 is located at the first position P1, the second coupling portion 410 may be separable from the first coupling portion 310.

Referring to FIGS. 19 and 20, while the stand neck 40 is located at the first position P1, the elastic block 415 may interfere with the first coupling body 311. While the stand neck 40 is located at the first position P1, the elastic block 415 may interfere with the bottom portion 3111 of the first coupling body 311. While the stand neck 40 is located at the first position P1, the elastic block 415 may be pressed by the bottom portion 3111. As the elastic block 415 is pressed by the bottom portion 3111, the spring 414 may also be pressed by the elastic block 415. A lower surface of the elastic block 415 may be in contact with an upper surface of the bottom portion 3111. The elastic block 415 may be caught by the bottom portion 3111. The elastic block 415 may be accommodated inside the second coupling body 411. The elastic block 415 may be positioned in the second hollow part 412. The elastic block 415 may not protrude from the second coupling body 411.

While the stand neck 40 is located at the first position P1, the elastic block 415 may not be engaged with the coupling hole 315. The elastic block 415 may not be located in the coupling hole 315. The protruding body 4152 of the elastic block 415 may not be located in the coupling hole 315. The second protruding portion 4152*b* of the protruding body 4152 may be caught by the bottom portion 3111. The second protruding portion 4152*b* of the protruding body 4152 may be covered by the bottom portion 3111. The second protruding portion 4152*b* of the protruding body 4152 may not be exposed to the outside through the coupling hole 315.

FIG. 21 shows an example of a state in which a stand neck is inserted in a stand base and then rotates in a first direction with respect to the stand base. FIG. 22 is a cross-sectional view taken along line C-C' of FIG. 21. FIG. 23 is a cross-sectional view taken along line D-D' of FIG. 21. FIG. 24 is a cross-sectional view taken along line E-E' of FIG. 21. FIG. 25 is an enlarged view showing parts of bottoms of the stand base and the stand neck shown in FIG. 21.

Referring to FIG. 21, the stand neck 40 may be located at the second position P2 at which the second coupling portion 410 is coupled with the first coupling portion 310. While the stand neck 40 is located at the second position P2, the second coupling portion 410 may be coupled with the first coupling portion 310. While the stand neck 40 is located at the second position P2, the second coupling portion 410 may be fixed to the first coupling portion 310. While the stand neck 40 is located at the second position P2, the second coupling portion 410 may not depart from the first coupling portion 310. While the stand neck 40 is located at the second position P2, the second coupling portion 410 may not be separated from the first coupling portion 310. While the stand neck 40 is located at the second position P2, it can be understood that the stand neck 40 has been assembled with the stand base 30.

For example, the stand neck 40 may rotate in a first direction R1 from the first position P1 (see FIGS. 17 to 20) to move to the second position P2 (see FIGS. 21 to 25). As the stand neck 40 rotates in the first direction R1 from the first position P1, the coupling protrusion 413 accommodated in the first groove portion 3131 may rotate in the first direction R1 to be accommodated in the second groove portion 3132.

Referring to FIG. 22, while the stand neck 40 is located at the second position P2, the second groove portion 3132 may accommodate the coupling protrusion 413. While the stand neck 40 is located at the second position P2, the locking protrusion 314 may prevent the coupling protrusion 413 from departing from the coupling groove 313 (see FIG. 23). While the stand neck 40 is located at the second position P2, the coupling protrusion 413 may be accommodated in the second groove portion 3132 to interfere with the locking protrusion 314 (see FIG. 23). An upward movement of the coupling protrusion 413 accommodated in the second groove portion 3132 may be restricted by the locking protrusion 314. Accordingly, while the stand neck 40 is located at the second position P2, the second coupling portion 410 may be in the state of being coupled with the first coupling portion 310.

Referring to FIGS. 23 to 25, while the stand neck 40 is located at the second position P2, the elastic block 415 may not interfere with the first coupling body 311. While the stand neck 40 is located at the second position P2, the elastic block 415 may not interfere with the bottom portion 3111 of the first coupling body 311. While the stand neck 40 is located at the second position P2, the clastic block 415 and the spring 414 may not be pressed by the bottom portion 3111. The elastic block 415 may not be caught by the bottom portion 3111. The clastic block 415 may protrude from the second coupling body 411. The locking body 4151 may be accommodated inside the second coupling body 411, and the protruding body 4152 may protrude from the second coupling body 411 through the body hole 411*h*.

While the stand neck 40 is located at the second position P2, the elastic block 415 may be engaged with the coupling hole 315. The protruding body 4152 of the elastic block 415 may be positioned inside the coupling hole 315. The first protruding portion 4152*a* of the protruding body 4152 may be engaged with the first hole area 3151. The first protruding portion 4152*a* of the protruding body 4152 may be positioned inside the first hole area 3151. The second protruding portion 4152*b* of the protruding body 4152 may be engaged with the second hole area 3152. The second protruding portion 4152*b* of the protruding body 4152 may be located inside the second hole area 3152. While the stand neck 40 is located at the second position P2, the protruding body 4152 may be exposed to the outside through the coupling hole 315. While the stand neck 40 is located at the second position P2, the first protruding portion 4152*a* of the protruding body 4152 may be exposed to the outside through the first hole area 3151. While the stand neck 40 is located at the second position P2, the second protruding portion 4152*b* of the protruding body 4152 may be exposed to the outside through the second hole area 3152.

In summary, as the stand neck 40 rotates in the first direction R1 from the first position P1 to move to the second position P2, the coupling protrusion 413 may move from the first groove portion 3131 to the second groove portion 3132 to interfere with the locking protrusion 314. Also, as the stand neck 40 rotates in the first direction R1 from the first position P1 to move to the second position P2, a shape of the protruding body 4152 of the elastic block 415 may correspond to a shape of the coupling hole 315, and the elastic block 415 may not interfere with the coupling body 311. That is, the elastic block 415 may not be pressed by the bottom portion 3111. Accordingly, the spring 414 may also not be pressed by the elastic block 415, and the compressed spring (see 414 of FIG. 19) may be restored to an original state (see 414 of FIGS. 23 and 24). For example, as an upward movement of the second coupling portion 410 is restricted and a downward movement of the second coupling portion 410 is allowed (that is, the coupling protrusion 413 interferes with the locking protrusion 314), the spring 414 may have an clastic restoring force applied substantially downward. By the clastic restoring force of the spring 414, the elastic block 415 may move relative to the second coupling body 411. By the elastic restoring force of the spring 414, the elastic block 415 may protrude through the coupling hole 315. As a result, as the stand neck 40 rotates in the first direction R1 from the first position P1 to move to the second position P2, the elastic block 415 may protrude from the second coupling body 411 to be engaged with the coupling hole 315. In other words, as the stand neck 40 rotates in the first direction R1 from the first position P1 to move to the second position P2, the elastic block 415 may move downward by the spring 414 without interfering with the first coupling body 311, and the protruding body 4152 of the elastic block 415 may be located inside the coupling hole 315.

Meanwhile, the first coupling portion 310 may include at least one fixing rib 3161, 3162, and/or 3163 (see FIG. 24).

For example, the first coupling portion 310 may include a first fixing rib 3161. The first fixing rib 3161 may fix the coupling protrusion 413 coupled with the coupling groove 313. The first fixing rib 3161 may fix the coupling protrusion 413 accommodated in the second groove portion 3132. The first fixing rib 3161 may protrude toward the second groove portion 3132. The first fixing rib 3161 may be in contact with the upper side 4132 of the coupling protrusion 413. In the drawings, two first fixing ribs 3161 are shown. However, the disclosure is not limited thereto. A single first fixing rib 3161 or three or more first fixing ribs 3161 may be provided. The number of the first fixing rib 3161 is not limited.

For example, the first coupling portion 310 may include a second fixing rib 3162. The second fixing rib 3162 may fix the coupling protrusion 413 coupled with the coupling groove 313. The second fixing rib 3162 may fix the coupling protrusion 413 accommodated in the second groove portion 3132. The second fixing rib 3162 may protrude toward the second groove portion 3132. The second fixing rib 3162 may face the first fixing rib 3161. The second fixing rib 3162 may be in contact with a lower side 4133 of the coupling protrusion 413. In the drawings, a single second fixing rib 3162 is shown. However, the disclosure is not limited thereto. Two or more second fixing ribs 3162 may be provided. The number of the second fixing rib 3162 is not limited.

For example, the first coupling portion 310 may include a third fixing rib 3163. The third fixing rib 3163 may be formed on the inner side surface of the first coupling body 311. While the first coupling portion 310 is coupled with the second coupling portion 410, the third fixing rib 3163 may fix the outer side surface of the second coupling body 411 of the second coupling portion 410. For example, a plurality of third fixing ribs 3163 may be provided, and the plurality of third fixing ribs 3163 may be arranged along a circumferential direction of the first coupling body 311. However, the disclosure is not limited thereto, and the number of the third fixing rib 3163 is not limited.

While the first coupling portion 310 is coupled with the second coupling portion 410, at least one fixing rib 3161, 3162 and/or 3163 may prevent the second coupling portion 410 from shaking with respect to the first coupling portion 310. That is, the stand neck 40 may be stably coupled with the stand base 30. Stability in use of the supporting device 20 may be improved.

Successively, an example of a process of separating the stand neck 40 from the stand base 30 will be described with reference to FIGS. 26 to 30. For example, the process of separating the stand neck 40 from the stand base 30 may be performed in a reverse order of the process of coupling the stand neck 40 with the stand base 30 described with reference to FIGS. 14 to 25.

FIG. 26 is a bottom perspective view of a supporting device according to an embodiment. FIG. 27 shows an example of a state in which an elastic block is pressed, in a cross-sectional view taken along line F-F' of FIG. 26. FIG. 28 shows an example of a state in which an elastic block is pressed and a stand neck rotates in a second direction with respect to the stand base. FIG. 29 is a cross-sectional view taken along line G-G' of FIG. 28. FIG. 30 shows an example of a state in which a stand neck is separated from a stand base.

Referring to FIGS. 26 and 27, the elastic block 415 of the supporting device 20 may be pressed. While the stand neck 40 is coupled with the stand base 30, the elastic block 415 engaged with the coupling hole 315 may be pressed by an external force. While the first coupling portion 310 is coupled with the second coupling portion 410, the elastic block 415 exposed through the coupling hole 315 may be pressed by an external force. As the elastic block 415 is pressed, the spring 414 may also be pressed. While the elastic block 415 is pressed, the elastic block 415 may move upward to be accommodated inside the second coupling body 411. The spring 414 may be compressed. For example, a user may press the elastic block 415 upward to prevent the elastic block 415 from protruding from the coupling hole

315. Thereby, the elastic block 415 may be pressed not to be engaged with the coupling hole 315.

Referring to FIGS. 28 and 29, while the elastic block 415 of the supporting device 20 is pressed (see FIG. 27), the stand neck 40 may rotate in the second direction R2 that is opposite to the first direction R1. As the elastic block 415 engaged with the coupling hole 315 is pressed and the stand neck 40 rotates in the second direction R2, the coupling protrusion 413 accommodated in the second groove portion 3132 may rotate in the second direction R2 to be accommodated in the first groove portion 3131. The coupling protrusion 413 accommodated in the first groove portion 3131 may not interfere with the locking body 314. An upward movement of the coupling protrusion 413 accommodated in the first groove portion 3131 may not be restricted. The coupling protrusion 413 accommodated in the first groove portion 3131 may be movable upward without interfering with the locking body 314. That is, the second coupling portion 410 may be separable from the first coupling portion 310.

As a result, as the elastic block 415 engaged with the coupling hole 315 is pressed and the stand neck 40 rotates in the second direction R2, the stand neck 40 may move from the second position P2 to the first position P1. As the elastic block 415 engaged with the coupling hole 315 is pressed and the stand neck 40 rotates in the second direction R2, the stand neck 40 may be separable from the stand base 30.

Referring to FIG. 30, the supporting device 20 may be disassembled into the stand base 30 and the stand neck 40. In the state in which the elastic block 415 of the supporting device 20 is pressed and the stand neck 40 rotates in the second direction R2 (see FIGS. 28 and 29), the stand neck 40 may move upward from the stand base 30. In the state in which the elastic block 415 of the supporting device 20 is pressed and the stand neck 40 rotates in the second direction R2 (see FIGS. 28 and 29), the stand neck 40 may be separated from the stand base 30.

For example, in the state in which the elastic block 415 of the supporting device 20 is pressed and the stand neck 40 rotates in the second direction R2 (see FIGS. 28 and 29), the spring 414 being in a compressed state (see FIG. 44) may be restored to the original state. For example, as a downward movement of the second coupling portion 410 is restricted and an upward movement of the second coupling portion 410 is allowed (see FIGS. 28 and 29), the spring 414 may have an elastic restoring force applied substantially upward. Accordingly, while the stand neck 40 moves upward from the stand base 30, the stand neck 40 may be more easily separated from the stand base 30 by the elastic restoring force of the spring 414. For example, a user may separate the stand neck 40 from the stand base 30 without applying a great force.

Generally, a supporting device may be provided as an assembly of various components. For example, the supporting device may include a stand base and a stand neck coupled with the stand base. However, upon assembling of the stand neck with the stand base, a separate coupling member (for example, a screw, etc.) or a separate tool (for example, a driver, etc.) may be required. Likewise, upon disassembling of the stand neck from the stand base, a separate tool may be required because the coupling member between the stand base and the stand neck needs to be disassembled.

In contrast, according to the disclosure, the stand neck 40 may be assembled/disassembled with/from the stand base 30 without using a separate coupling member (for example, a screw, etc.) or a separate tool (for example, a driver, etc.). By aligning the stand neck 40 with the stand base 30 and then rotating the stand neck 40 by a preset range, the stand neck 40 may be easily coupled with the stand base 30. For example, the elastic block 415 of the stand neck 40 may elastically protrude to be engaged with the coupling hole 315 of the stand base 30. For example, the coupling protrusion 413 of the stand neck 40 may be coupled with the coupling groove 313 of the stand base 30. Also, by rotating the stand neck 40 coupled with the stand base 30 by a preset range, the stand neck 40 may be easily separated from the stand base 30. For example, by pressing the elastic block 415 to rotate the stand neck 40, the stand neck 40 may be separable from the stand base 30. As a result, the supporting device 20 according to the disclosure may be easily assembled and/or disassembled, which improves a user's convenience of use.

According to an embodiment, a supporting device 20 for supporting a display 10 may include: a stand base 30 including a first coupling portion 310; and a stand neck 40 including a second coupling portion 410 being couplable with the first coupling portion, the stand neck being supported by the stand base and being connectable to a rear side of the display. The first coupling portion 310 may include: a first coupling body 311 formed in a hollow shape; and a coupling hole 315 formed in the first coupling body. The second coupling portion 410 may include: a second coupling body 411 being insertable in the first coupling body; a spring 414 accommodated inside the second coupling body; and an elastic block 415 being movable relative to the second coupling body by the spring, and corresponding to the coupling hole.

The stand neck 40 may be movable between a first position P1 at which the second coupling portion is separable from the first coupling portion and a second position P2 at which the second coupling portion is coupled with the first coupling portion.

As the stand neck 40 rotates in one direction R1 from the first position P1 to move to the second position P2, the elastic block 415 may protrude from the second coupling body 411 to be engaged with the coupling hole 315.

As the elastic block engaged with the coupling hole is pressed and the stand neck may rotate in an opposite direction R2 of the one direction, the stand neck 40 may move from the second position P2 to the first position P1.

The first coupling body may include a bottom portion 3111 in which the coupling hole is formed, and a side wall portion 3112 extending upward from the bottom portion. While the stand neck is located at the first position P1, the elastic block may interfere with the bottom portion. While the stand neck is located at the second position P2, the elastic block may be engaged with the coupling hole.

While the stand neck is located at the first position P1, the elastic block may be accommodated inside the second coupling body. While the stand neck is located at the second position P2, the elastic block may protrude from the second coupling body.

The spring 414 may be configured to elastically bias the elastic block 415 in a vertical direction.

The second coupling body 411 may include an upper portion 411a, and a lower portion 411b coupled with a lower part of the upper portion and including a body hole 411h.

The elastic block 415 may include a locking body 4151 caught by the lower portion and accommodated inside the second coupling body, and a protruding body 4152 extending downward from the locking body and being protrudable from the second coupling body through the body hole.

The protruding body 4152 of the elastic block may be exposed to outside through the coupling hole.

The second coupling portion 410 may include a coupling protrusion 413 formed on an outer side surface of the second coupling body. The first coupling portion 310 may include a coupling groove 313 formed in an inner side surface of the first coupling body and guiding the coupling protrusion. The first coupling portion 310 may include a locking protrusion 314 configured to prevent, while the stand neck is located at the second position, the coupling protrusion from departing from the coupling groove, the locking protrusion being formed adjacent to the coupling groove.

The coupling groove 313 of the first coupling portion may include: a first groove portion 3131 configured to accommodate the coupling protrusion while the stand neck is located at the first position; and a second groove portion 3132 extending from a lower part of the first groove portion and configured to accommodate the coupling protrusion while the stand neck is located at the second position.

The locking protrusion 314 may include a first inclined portion 3141 inclined downward from the first groove portion toward the second groove portion, and the coupling protrusion 413 may include a second inclined portion 4131 corresponding to the first inclined portion.

The first coupling portion may include a fixing rib 3161 and 3162 protruding toward the second groove portion to fix the coupling protrusion accommodated in the second groove portion.

The first coupling portion may include a fixing rib 3163 formed on an inner side surface of the first coupling body to fix, while the first coupling portion is coupled with the second coupling portion, an outer side surface of the second coupling body.

The stand neck 40 may include: a frame 420 including the second coupling portion and extending in a vertical direction; a supporting arm 450 supporting the rear side of the display; and a lifting member 470 configured to move the supporting arm in the vertical direction with respect to the frame.

A display apparatus 1 may include: a stand base 30 including a first coupling portion 310; a stand neck 40 including a second coupling portion 410 corresponding to the first coupling portion; and a display 10 including a display panel 11 on which an image is displayed and a cover 12 covering a rear side of the display panel and supported by the stand neck. The first coupling portion 310 may include: a first coupling body 311 including a bottom portion 3111 and a side wall portion 3112 extending from the bottom portion 3111; a hollow part 312 formed by the side wall portion; and a coupling hole 315 penetrating the bottom portion. The second coupling portion 410 may include: a second coupling body 411 being insertable into the hollow part; and an elastic block 415 connected to the second coupling body, being movable relative to the second coupling body, and including a shape corresponding to the coupling hole.

The second coupling portion may include a spring 414 accommodated inside the second coupling body and configured to elastically bias the elastic block.

The first coupling portion may include a coupling groove 313 formed in an inner side surface of the side wall portion. The second coupling portion may include a coupling protrusion 413 formed on an outer side surface of the second coupling body and being couplable with the coupling groove. The elastic block 415 may protrude, while the coupling protrusion is coupled with the coupling groove, from the second coupling body to be engaged with the coupling hole 315.

The first coupling portion may further include a locking protrusion 314 configured to be, while the coupling protrusion is coupled with the coupling groove, in contact with an upper side of the coupling protrusion to prevent the coupling protrusion from departing from the coupling groove.

The second coupling portion 410 may be rotatably coupled with the first coupling portion 310.

According to an embodiment, a supporting device for supporting a display may include a stand base including a first coupling portion, and the first coupling portion including a first coupling body formed in a hollow shape, and a coupling hole formed in the first coupling body; and a stand neck including a second coupling portion couplable with the first coupling portion, and the second coupling portion including a second coupling body that is insertable into the first coupling body, a spring accommodated inside the second coupling body, and an elastic block that is movable relative to the second coupling body by the spring and is engageable with the coupling hole.

According to an embodiment, the stand base and the stand neck may be configured so that the stand neck is positionable at a first position with respect to the stand base at which the second coupling body is inserted into the first coupling body and the elastic block is unengaged with the coupling hole, and the stand neck is rotatable in a first direction from the first position to a second position with respect to the stand base so that, when the stand neck is at the second position, the second coupling portion is coupled to the first coupling portion, the elastic block is engaged with the coupling hole due to movement of the elastic block relative to the second coupling body by the spring as the stand neck rotated in the first direction from the first position to the second position, and the stand neck is supported by the stand base and is connectable to a rear side of the display.

According to an embodiment, while the stand neck is at the first position, the second coupling portion may be separable from the first coupling portion, and, while the stand neck is at the second position, the second coupling portion may not be separable from the first coupling portion.

According to an embodiment, the stand base and the stand neck may be configured so that, as the stand neck rotates in the first direction from the first position to move to the second position, the elastic block protrudes from the second coupling body to become engaged with the coupling hole.

According to an embodiment, the stand base and the stand neck may be configured so that, with stand neck being at the second position and the elastic block engaged with the coupling hole, the elastic block is pressable by an external force, and, when the stand neck is at the second position and the elastic block is pressed by the external force, the stand neck is rotatable in a second direction, opposite to the first direction, to move from the second position to the first position.

According to an embodiment, the first coupling body may include a bottom portion in which the coupling hole is formed, and a side wall portion extending upward from the bottom portion, and the stand base and the stand neck may be configured so that, while the stand neck is at the first position, the elastic block interferes with the bottom portion, and, while the stand neck is at the second position, the elastic block is engaged with the coupling hole.

According to an embodiment, the stand base and the stand neck may be configured so that, while the stand neck is at the first position, the elastic block is accommodated inside the second coupling body, and, while the stand neck is at the second position, the elastic block protrudes from the second coupling body.

According to an embodiment, the spring may be configured to elastically bias the elastic block in a vertical direction.

According to an embodiment, the second coupling body may include an upper portion, and a lower portion coupled with a lower part of the upper portion and including a body hole, and the elastic block may include a locking body caught by the lower portion and accommodated inside the second coupling body, and a protruding body extending downward from the locking body and being protrudable from the second coupling body through the body hole.

According to an embodiment, the protruding body of the elastic block may be exposed to outside through the coupling hole.

According to an embodiment, the second coupling portion may include a coupling protrusion on an outer side surface of the second coupling body, and the first coupling portion may include a coupling groove in an inner side surface of the first coupling body and configured to guide the coupling protrusion, and a locking protrusion configured to prevent, while the stand neck is at the second position, the coupling protrusion from departing from the coupling groove, the locking protrusion being adjacent to the coupling groove.

According to an embodiment, the coupling groove of the first coupling portion may include a first groove portion configured to accommodate the coupling protrusion while the stand neck is at the first position, and a second groove portion extending from a lower part of the first groove portion and configured to accommodate the coupling protrusion while the stand neck is at the second position.

According to an embodiment, the locking protrusion may include a first inclined portion inclined downward from the first groove portion toward the second groove portion, and the coupling protrusion may include a second inclined portion corresponding to the first inclined portion.

According to an embodiment, the first coupling portion may include a fixing rib protruding toward the second groove portion to fix the coupling protrusion accommodated in the second groove portion.

According to an embodiment, the first coupling portion may include a fixing rib on an inner side surface of the first coupling body to fix, while the second coupling portion is coupled to the first coupling portion, an outer side surface of the second coupling body.

According to an embodiment, the stand neck may include a frame including the second coupling portion and extending in a vertical direction, a supporting arm configured to support the rear side of the display, and a lifting member configured to move the supporting arm in the vertical direction with respect to the frame.

According to a concept of the disclosure, convenience in use of the supporting device may be improved.

According to a concept of the disclosure, the supporting device may be easily assembled and/or disassembled.

According to a concept of the disclosure, upon assembling and/or disassembling of the supporting device, a separate coupling member or tool may not be required.

Effects that can be achieved by the disclosure are not limited to the above-mentioned those, and other effects not mentioned may be clearly understood by one of ordinary skill in the technical art to which the disclosure belongs.

So far, specific embodiments have been shown and described. However, the disclosure is not limited to the above-described embodiments, and various modifications can be made by those skilled in the art without departing from the gist of the technical idea of the disclosure defined by the claims below.

The invention claimed is:

1. A supporting device for supporting a display, comprising:
   a stand base including a first coupling portion, and the first coupling portion including:
      a first coupling body formed in a hollow shape, and
      a coupling hole formed in the first coupling body; and
   a stand neck including a second coupling portion couplable with the first coupling portion, and the second coupling portion including:
      a second coupling body that is insertable into the first coupling body,
      a spring accommodated inside the second coupling body, and
      an elastic block that is movable relative to the second coupling body by the spring and is engageable with the coupling hole,
      wherein the spring is configured to elastically bias the elastic block in a vertical direction, and the stand base and the stand neck are configured such that:
         the second coupling body is insertable into the first coupling body,
         with the second coupling body inserted into the first coupling body, the stand neck is rotatable, and,
         as the stand neck rotates, the elastic block protrudes from the second coupling body to become engaged with the coupling hole, to couple the second coupling portion with the first coupling portion.

2. The supporting device of claim 1, wherein the stand base and the stand neck are configured such that:
   the stand neck is positionable at a first position with respect to the stand base at which the second coupling body is inserted into the first coupling body and the elastic block is unengaged with the coupling hole,
   the stand neck is rotatable in a first direction from the first position to a second position with respect to the stand base se-such that, when the stand neck is at the second position, the second coupling portion is coupled to the first coupling portion, the elastic block is engaged with the coupling hole due to movement of the elastic block relative to the second coupling body by the spring as the stand neck rotated in the first direction from the first position to the second position, and the stand neck is supported by the stand base and is connectable to a rear side of the display,
   while the stand neck is at the first position, the second coupling portion is separable from the first coupling portion, and,
   while the stand neck is at the second position, the second coupling portion is not separable from the first coupling portion.

3. The supporting device of claim 2, wherein the stand base and the stand neck are configured such that:
   as the stand neck rotates in the first direction from the first position to move to the second position, the elastic block protrudes from the second coupling body to become engaged with the coupling hole.

4. The supporting device of claim 3, wherein the stand base and the stand neck are configured such that:
   with stand neck being at the second position and the elastic block engaged with the coupling hole, the elastic block is pressable by an external force, and, when the stand neck is at the second position and the elastic block is pressed by the external force, the stand neck is rotatable in a second direction, opposite to the first direction, to move from the second position to the first position.

5. The supporting device of claim 2, wherein
   the first coupling body includes a bottom portion in which the coupling hole is formed, and a side wall portion extending upward from the bottom portion, and
   the stand base and the stand neck are configured such that:
      while the stand neck is at the first position, the elastic block interferes with the bottom portion, and
      while the stand neck is at the second position, the elastic block is engaged with the coupling hole.

6. The supporting device of claim 2, wherein the stand base and the stand neck are configured such that:
   while the stand neck is at the first position, the elastic block is accommodated inside the second coupling body, and
   while the stand neck is at the second position, the elastic block protrudes from the second coupling body.

7. The supporting device of claim 2, wherein
   the second coupling portion includes a coupling protrusion on an outer side surface of the second coupling body, and
   the first coupling portion includes:
      a coupling groove in an inner side surface of the first coupling body and configured to guide the coupling protrusion, and
      a locking protrusion configured to prevent, while the stand neck is at the second position, the coupling protrusion from departing from the coupling groove, the locking protrusion being adjacent to the coupling groove.

8. The supporting device of claim 7, wherein the coupling groove of the first coupling portion includes:
   a first groove portion configured to accommodate the coupling protrusion while the stand neck is at the first position, and
   a second groove portion extending from a lower part of the first groove portion and configured to accommodate the coupling protrusion while the stand neck is at the second position.

9. The supporting device of claim 8, wherein
   the locking protrusion includes a first inclined portion inclined downward from the first groove portion toward the second groove portion, and
   the coupling protrusion includes a second inclined portion corresponding to the first inclined portion.

10. The supporting device of claim 8, wherein the first coupling portion includes a fixing rib protruding toward the second groove portion to fix the coupling protrusion accommodated in the second groove portion.

11. The supporting device of claim 1, wherein the first coupling portion includes a fixing rib on an inner side surface of the first coupling body to fix, while the second coupling portion is coupled to the first coupling portion, an outer side surface of the second coupling body.

12. A supporting device for supporting a display, comprising:
   a stand base including a first coupling portion, and the first coupling portion including a first coupling body formed in a hollow shape, and a coupling hole formed in the first coupling body; and
   a stand neck including a second coupling portion couplable with the first coupling portion, and the second coupling portion including:

a second coupling body that is insertable into the first coupling body, a spring accommodated inside the second coupling body, and an elastic block that is movable relative to the second coupling body by the spring and is engageable with the coupling hole, wherein the second coupling body includes:

an upper portion, and a lower portion coupled with a lower part of the upper portion and including a body hole, and the elastic block includes:

a locking body that, when the first coupling portion and the second coupling portion are coupled, is caught by the lower portion and accommodated inside the second coupling body, and a protruding body extending downward from the locking body and, when the first coupling portion and the second coupling portion are coupled, protrudes from the second coupling body through the body hole.

13. The supporting device of claim 12, wherein, when the first coupling portion and the second coupling portion are coupled, the protruding body of the elastic block is exposed to outside of the stand base through the coupling hole.

14. A supporting device for supporting a display, comprising:

a stand base including a first coupling portion, and the first coupling portion including a first coupling body formed in a hollow shape, and a coupling hole formed in the first coupling body; and a stand neck including:

a frame extending in a vertical direction and including a second coupling portion couplable with the first coupling portion, and the second coupling portion including a second coupling body that is insertable into the first coupling body, a spring accommodated inside the second coupling body, and an elastic block that is movable relative to the second coupling body by the spring and is engageable with the coupling hole, a supporting arm configured to support a rear side of the display, and a lifting member configured to move the supporting arm in the vertical direction with respect to the frame.

* * * * *